United States Patent
Cha et al.

(10) Patent No.: US 7,283,987 B2
(45) Date of Patent: Oct. 16, 2007

(54) COMPRESSION SCHEME FOR IMPROVING CACHE BEHAVIOR IN DATABASE SYSTEMS

(75) Inventors: Sang K. Cha, Seoul (KR); Ki-Hong Kim, Seoul (KR); Keun-Joo Kwon, Seoul (KR)

(73) Assignee: SAP AG (DE)

( * ) Notice: Subject to any disclaimer, the term of this patent is extended or adjusted under 35 U.S.C. 154(b) by 403 days.

(21) Appl. No.: 10/087,360

(22) Filed: Mar. 1, 2002

(65) Prior Publication Data
US 2002/0169784 A1    Nov. 14, 2002

Related U.S. Application Data

(60) Provisional application No. 60/272,828, filed on Mar. 5, 2001.

(51) Int. Cl.
G06F 17/30 (2006.01)
G06F 17/00 (2006.01)
(52) U.S. Cl. ............... 707/2; 707/1; 707/3; 707/101
(58) Field of Classification Search ............ 707/103, 707/100, 2, 3, 1, 101
See application file for complete search history.

(56) References Cited

U.S. PATENT DOCUMENTS

| | | | |
|---|---|---|---|
| 6,134,541 A * | 10/2000 | Castelli et al. ............ 707/2 |
| 6,252,605 B1 * | 6/2001 | Beesley et al. ............ 345/441 |
| 6,470,344 B1 * | 10/2002 | Kothuri et al. ............ 707/100 |
| 6,601,062 B1 * | 7/2003 | Deshpande et al. ............ 707/3 |
| 6,654,760 B2 * | 11/2003 | Baskins et al. ............ 707/101 |
| 6,671,694 B2 * | 12/2003 | Baskins et al. ............ 707/102 |
| 6,868,410 B2 * | 3/2005 | Fortin et al. ............ 706/45 |
| 7,072,891 B2 * | 7/2006 | Lee et al. ............ 707/6 |
| 7,080,065 B1 * | 7/2006 | Kothuri et al. ............ 707/3 |
| 2004/0119611 A1 * | 6/2004 | Oh et al. ............ 340/995.12 |

OTHER PUBLICATIONS

"Compacting Discriminator Information for Spatial Trees" by Inga Sitzmann and Peter J. Stuckey, Copyright 2001, Australian Computer Society, Inc.*

* cited by examiner

*Primary Examiner*—Don Wong
*Assistant Examiner*—Thanh-Ha Dang
(74) *Attorney, Agent, or Firm*—Schwegman, Lundberg & Woessner, P.A.

(57) ABSTRACT

A cache-conscious version of the R-tree, called the CR-tree, is disclosed. To pack more entries in a node, the CR-tree compresses MBR keys, which occupy substantial part of the index data. It first represents the coordinates of an MBR key relatively to the lower left corner of its parent MBR to eliminate the leading 0's from the relative coordinate representation. Then, it quantizes the relative coordinates with a fixed number of bits to further cut off the trailing less significant bits. Consequently, the CR-tree becomes significantly wider and smaller than the ordinary R-tree. The experimental and analytical results show that the two-dimensional CR-tree performs search faster than the ordinary R-tree while maintaining similar update performance and consuming less memory space.

16 Claims, 26 Drawing Sheets

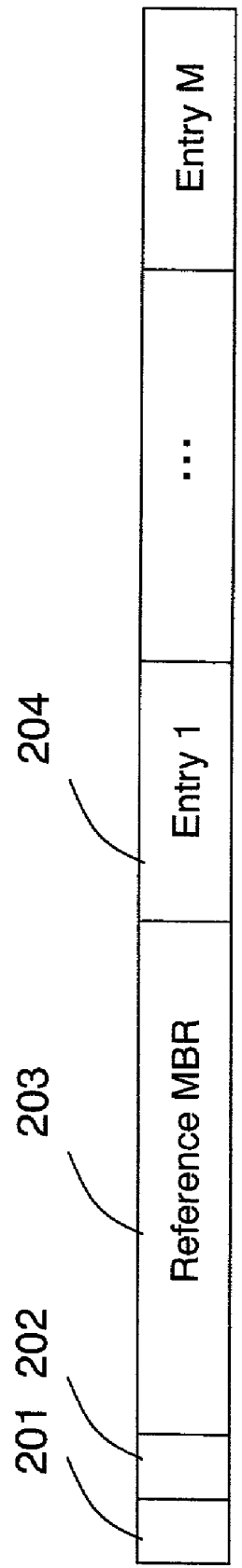
FIG. 2A
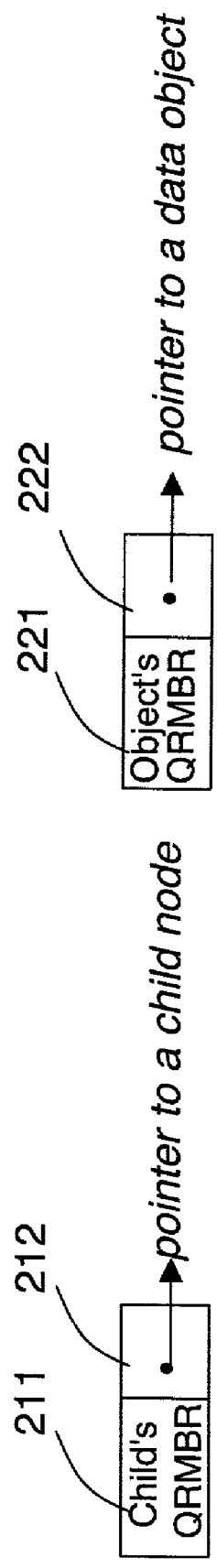
FIG. 2B
FIG. 2C (b) Selectivity = 0.25%

(a) Selectivity = 0.01%

(b) Selectivity = 0.25%

(a) Selectivity = 0.01%

(b) Increase of Object MBR Size (a) Amount of Accessed Index Data

US 7,283,987 B2

COMPRESSION SCHEME FOR IMPROVING CACHE BEHAVIOR IN DATABASE SYSTEMS

RELATED APPLICATION

This application claims the benefit of co-pending U.S. Provisional Application Ser. No. 60/272,828, filed Mar. 5, 2001, entitled "Compression Scheme for Improving Index Cache Behavior in Main-Memory Database."

BACKGROUND OF THE INVENTION

I. Technical Field

This invention relates generally to database systems. More particularly, this invention relates to a compression scheme for improving index cache behavior in main-memory database systems.

II. Description of the Related Art

With server DRAM modules priced at less than $2,000/GB, many of the database tables and indexes can now fit in the main memory of modern computer systems. It is predicted that it will be common to have terabytes of main memory for a database within ten years or so.

With such a large amount of memory, the traditional bottleneck of disk access almost disappears, especially for search transactions. Instead, memory access becomes a new bottleneck. A recent study with commercial DBMSs shows that half of the execution time is spent on memory access when the whole database resides in memory.

Since the speed in DRAM chips has been traded off for the capacity, the gap between the CPU speed and the DRAM speed has grown significantly during the past decade. In today's computer systems, each memory access costs tens of processor cycles. To overcome this gap, modern processors adopt up to several megabytes of SRAM as the cache, which can be accessed in just one or two processor cycles.

Recognizing the widening gap between the CPU speed and the DRAM speed, the importance of the cache behavior in the design of main memory indexes was emphasized. It was shown that the cache-conscious search trees ("CSS-trees") perform lookups much faster than binary search trees and T-trees in the read-only environment. B+-trees and their variants were shown to exhibit a reasonably good cache behavior.

For example, CSB+-trees ("Cache Sensitive B+-trees") store child nodes contiguously in memory to eliminate most child pointers in the nodes except the first one. The location of the i-th child node is computed from that of the first child. Providing more room for keys in the node, this pointer elimination approach effectively doubles the fanout of a B+-tree. Given the node size in the order of the cache block size, the fanout doubling reduces the height of the B+-tree, which again leads to smaller number of cache misses during the tree traversal.

Note that such a pointer elimination technique does not provide much benefit in disk-based indexes where the fanout is typically in the order of a few hundreds and doubling the fanout does not lead to an immediate reduction in the tree height.

However, the pointer elimination technique cannot be directly applied to multidimensional index structures such as the R-tree, which have numerous application domains such as spatio-temporal databases, data warehouses, and directory servers. The data object stored in an R-tree are approximated by, so called, minimum bounding rectangles ("MBRs") in the multidimensional index space, where each MBR is the minimal hyper-rectangle (i.e. 2-dimensional or higher-dimensional rectangle or box) enclosing the corresponding data object. Those skilled in the art would appreciate the MBR may be extended to a multi-dimensional shape including boxes or pyramids.

Typically, MBRs are much larger than pointers. Thus, pointer elimination alone cannot widen the index tree to reduce the tree height significantly. For example, when the 16-byte MBR is used for the two-dimensional key, the simple elimination of a 4-byte pointer provides at most 25% more room for the keys, and this increase is not big enough to make any significant difference in the tree height for the improved cache behavior.

Therefore, there is a need for a scheme for improving cache behavior to in accessing multidimensional indexes to access main-memory database.

SUMMARY OF THE INVENTION

Recognizing that the MBR keys occupy most of index data in the multidimensional index, R-trees, the present invention achieves inexpensive compression of MBR keys to improve the index cache behavior. A preferred embodiment of the present invention, called "CR-Tree" (Cache-conscious R-Tree), where the child nodes are grouped into a parent node so that each node occupies only a small portion of the data space of its parent node. In CR-tree, an MBR is represented relative to its parent MBR so that the coordinates of the resultant relative MBR have a fewer number of significant bits with many leading 0's. To further reduce the number of bits per MBR, the CR-tree also cuts off trailing insignificant bits by quantization.

The analytical results and the experimental results agree showing that the compression technique can reduce the MBR size to less than one fourth of the uncompressed one, thereby increasing the fanout by more than 150%. A potential problem with the proposed technique is that the information loss by quantization may incur false hits, which have to be filtered out through a subsequent refinement step. However, requiring this refinement step itself is not a problem because it is needed in most multidimensional indexes, and it is possible to keep the number of false hits negligibly small by choosing the quantization level properly such that the cost of filtering out false hits can be paid off by the significant saving in cache misses.

The present invention also includes several alternative embodiments in the design of CR-tree including whether to use the pointer elimination technique introduced in the CSB+-tree, whether to apply the proposed compression technique to leaf nodes or not, the choice of quantization levels, and the choice of node size. The experimental results show that all the resultant CR-tree variants significantly outperform the R-tree in terms of the search performance and the space requirement. The basic CR-tree that uses only the proposed technique performs search operations faster than the R-tree while performing update operations similarly to the R-tree and using less memory space. Compared with the basic CR-tree, most of CR-tree variants use less memory space with some algorithmic overhead.

BRIEF DESCRIPTION OF THE DRAWINGS

FIGS. 2A, 2B and 2C are illustrations of the data structure of the CR-tree.

DESCRIPTION OF THE PREFERRED EMBODIMENT

The present invention is based on making the R-tree cache-conscious by compressing MBRs. An R-Tree is a height-balanced tree data structure designed specifically for indexing multi-dimensional data objects in a database. It stores the minimum bounding rectangle ("MBR") with 2 or higher dimension of an data object as the key in the leaf pages. The present invention is also applicable to a variant of R-Tree called R*-Tree which improves the search performance by using a better heuristic for redistributing entries and dynamically reorganizing the tree during insertion. Those skilled in the art would appreciate that the present invention is readily applicable to other variants of R-Tree such as R+-Tree, Hilbert R-Tree, or an X-tree.

Figures 1A, 1B, 1C:
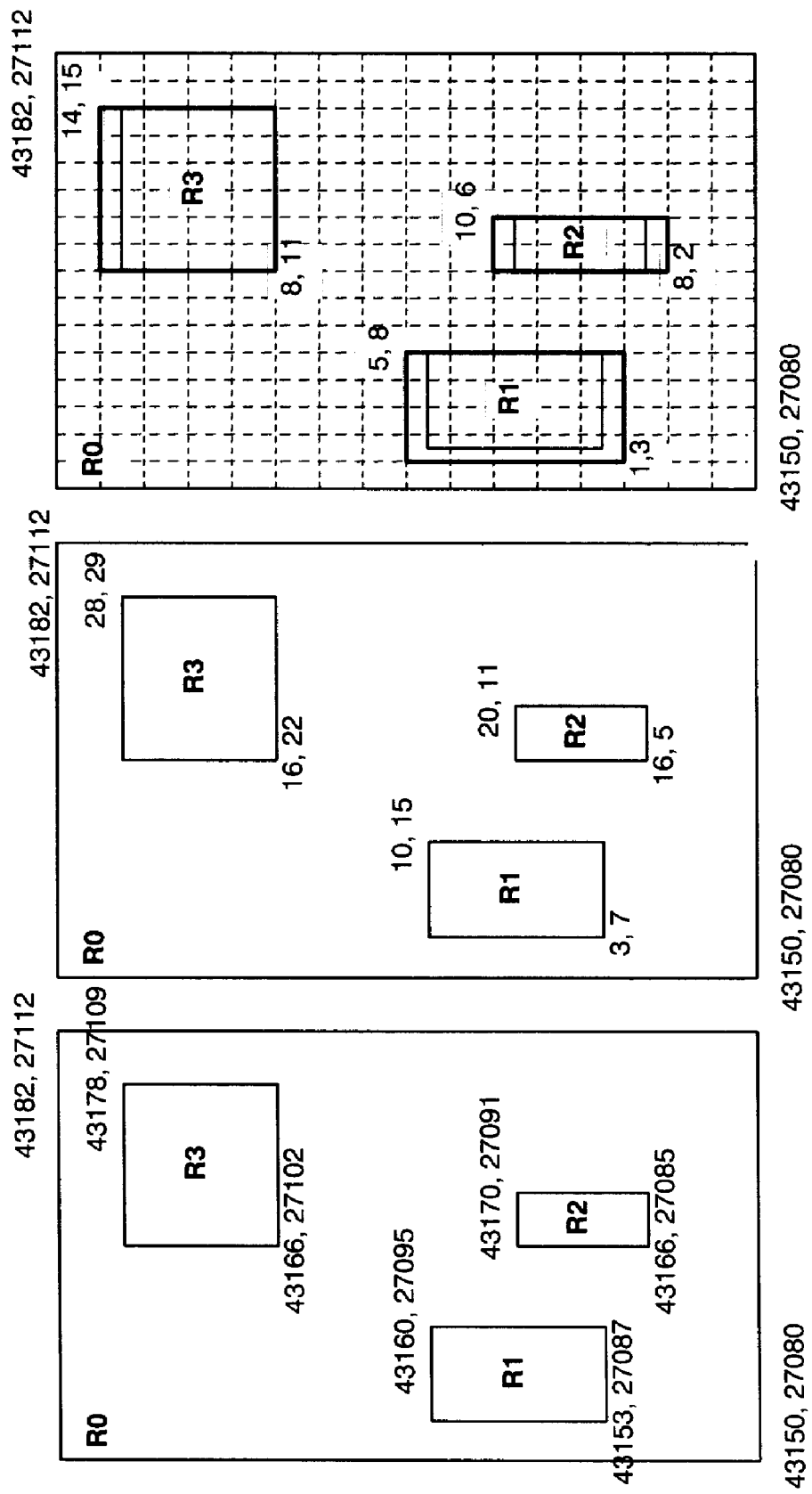
FIGS. 1A, 1B and 1C are illustrations of the QRMBR technique of the present invention.

FIG. 1 illustrates the compression scheme used in the present invention. FIG. 1A shows the absolute coordinates of R0~R3. FIG. 1B shows that the coordinates of R1~R3 represented relatively to the lower left corner of R0. These relative coordinates have a less number of significant bits than absolute coordinates. FIG. 1C shows the coordinates of R1~R3 quantized into 16 levels or four bits by cutting off trailing insignificant bits. The resultant MBR is called quantized MBR ("QRMBR"). Note that QRMBRs can be slightly larger than original MBRs.

A preferred embodiment of the present invention is an index tree, called CR-tree ("cache-conscious R-tree"), a R-tree variant that uses QRMBRs as index keys. The number of quantization levels may be the same for all the nodes in a CR-tree.

FIG. 2A shows the data structure of a CR-tree node. Each node can contain up to M entries. In addition, it keeps a flag 201 indicating whether it is a leaf node or non-leaf node (internal node), the number of stored entries 202, the reference MBR 203 that tightly encloses its entire child MBRs, a number of entries such as 204. The reference MBR is used to calculate the QRMBRs stored in the node.

FIG. 2B shows nonleaf nodes (internal nodes) that store entries in the form of (QRMBR 211, ptr 212), where QRMBR 211 is a quantized relative representation of the child node MBR, and ptr 212 is the address of a child node.

FIG. 2C shows leaf nodes that store entries in the form of (QRMBR 221, ptr 222), where QRMBR 221 is a quantized relative representation of the object MBR and ptr 222 refers to a data object. Typically, each of x and y coordinates are quantized into 256 levels or one byte.

One goal of the present invention is to reduce the index search time in main memory databases, especially using multidimensional indexes. In disk-based indexes, the disk access cost is almost irrelevant to the node size when moderately sized but the memory access cost is nearly proportional to the node size. While disk-based indexes are designed such that the number of disk accesses is minimized, main memory indexes need to be designed such that the amount of accessed index data or $c \cdot N_{node\ access}$ is minimized, where c denotes the node size in cache blocks and $N_{node\ access}$ denotes the number of accessed nodes.

In main memory indexes, the search time mainly consists of the key comparison time and the memory access time incurred by cache misses. If a cache miss occurs, the CPU has to wait until the missing data are cached. A cache miss can occur for three reasons: missing data, missing instructions, and missing TLB (table look-aside buffer) entries, which are needed to map a virtual memory address to a physical address. Therefore, the goal is expressed as minimizing $$T_{index\ search} \cong T_{key\ compare} + T_{data\ cache} + T_{TLB\ cache}$$

where $T_{key\ compare}$ is the time spent comparing keys that are cached, $T_{data\ cache}$ is the time spent caching data, $T_{TLB\ cache}$ is the time spent caching TLB entries. For the purpose of illustration, the caching time for missing instructions is omitted because the number of instruction misses mostly depends on the compiler used and the caching time is hard to control.

Let c be the size of a node in cache blocks, and let $N_{node\ access}$ be the number of nodes accessed processing a query. Let $C_{key\ compare}$ be the key comparison cost per cache block and $C_{cache\ miss\ be}$ the cost of replacing a cache block. Let $C_{TLB\ miss}$ be the cost of handling a single TLB miss. When the size of a node is smaller than that of a memory page, each access to a node incurs at most one TLB miss. For the purpose of illustration, it is assumed that nodes have been allocated randomly and that no node and no TLB entry are cached initially. Then, $$T_{index\ search} = c \times C_{key\ compare} \times N_{node\ access} + c \times C_{cache\ miss} \times N_{node\ access} + C_{TLB\ miss} \times N_{node\ access} = c \times N_{node\ access} \times (C_{key\ compare} + C_{cache\ miss} + C_{TLB\ miss}/c)$$

Since $C_{cache\ miss}$ and $C_{TLB\ miss}$ are constant for a given platform, it is possible to control three parameters: c, $C_{key\ compare}$, and $N_{node\ access}$. Among them, it is not expected to reduce $C_{key\ compare}$ noticeably because the key comparison is generally very simple. In addition, $C_{TLB\ miss}$ and $C_{cache\ miss}$ typically have similar values. Therefore, the index search time mostly depends on $c \cdot N_{node\ access}$.

It is observed that the amount of accessed index data can be best reduced by compressing index entries. $c \cdot N_{node\ access}$ can be minimized in three ways: changing the node size such that $c \cdot N_{node\ access}$ becomes minimal, packing more entries into a fixed-size node, and clustering index entries into nodes efficiently. The second is often termed as compression and the third as clustering.

The optimal node size is equal to the cache block size in one-dimensional case. In one-dimensional trees like the B+-tree, since exactly one internal node is accessed for each height even for the range query, the number of visited internal nodes decreases logarithmically in the node size. On the other hand, the number of visited leaf nodes decreases linearly with the node size, and c increases linearly with the node size. Therefore, $c \cdot N_{node\ access}$ increases with the node size, and thus it is minimal when c is one.

In multidimensional indexes, more than one internal nodes of the same height can be accessed even for the exact match query, and the number of accessed nodes of the same height decreases as the node size increases. Since this decrease is combined with the logscale decrease of tree height, there is a possibility that the combined decrease rate of node accesses exceeds the linear increase rate of c. It will be shown analytically that the optimal node size depends on several factors like the query selectivity and the cardinality (the number of entries in the index structure).

Compressing index entries is equivalent to increasing the node size without increasing c. In other words, it reduces $N_{node\ access}$ while keeping c fixed. Thus, it is highly desirable. Compression has been addressed frequently in disk-based indexes because it can reduce the tree height, but there is little dedicated work, especially in multidimensional indexes. The following analysis shows that why compression is not important in disk-based indexes but is important in main memory indexes.

Suppose that the tree A can pack f entries on average in a node and the tree B can pack 2f entries in a node using a good compression scheme. Then, their expected height is $\log_f N$ and $\log_{2f} N$, respectively. Thus, the height of B is $1/\log_2 f + 1 (= \log_f N / \log_{2f} N)$ times smaller than that of A. In disk-based indexes, the typical size of a node varies from 4 KB to 64 KB. Assuming that the node size is 8 KB and nodes are 70% full, f is 716($\cong 8192 \times 0.7/8$) for a B+-tree index and about 286($\cong 8192 \times 0.7/20$) for a two-dimensional R-tree. Thus, $1/\log_2 f$ is typically around 0.1. On the other hand, the size of a node is small in main memory indexes. With a node occupying two cache blocks or 128 bytes, f is about 11 for a B+-tree and about 4 for a two-dimensional R-tree. Thus, $1/\log_2 f$ is 0.29 for the B+-tree and 0.5 for the R-tree. In summary, node compression can reduce the height of main memory indexes significantly because the size of nodes is small.

Clustering has been studied extensively in disk-based index structures. In terms of clustering, the B+-tree is optimal in one-dimensional space, but no optimal clustering scheme is known for the multidimensional case. Instead, many heuristic schemes have been studied in various multidimensional index structures. The present invention can be used with most of these clustering schemes.

MBR Compression

There are two desirable properties for a MBR compression scheme. One is the property of overlap check without decompression. Whether two MBRs overlap or not can be determined directly from the corresponding compressed MBRs, without decompressing them. A basic R-tree operation is to check whether each MBR in a node overlaps a given query rectangle. Therefore, when storing compressed MBRs in a node, this property allows the R-tree operation to be performed by compressing the query rectangle once instead of decompressing all the compressed MBRs in the node.

The other property is simplicity. Compression and decompression should be computationally simple and can be performed only with already cached data. Conventional lossless compression algorithms as the one used in the GNU gzip program are expensive in terms of both computation and memory access because most of them maintain an entropy-based mapping table and look up the table for compression and decompression. Although they may be useful for disk-based indexes, they are not adequate for main memory indexes.

RMBR Technique

One way to compress is to represent keys relatively to a reference MBR within a node. If the coordinates of an MBR are represented relative to the lower left corner of its parent MBR, the resultant relative coordinates have many leading 0's. In the relative representation of MBR ("RMBR"), cutting off these leading 0's make it possible to effectively reduce the MBR size.

Let P and C be MBRs, which is represented by their lower left and upper right coordinates (xl, yl, xh, yh), and let P enclose C. Then, the relative representation of C with respect to P has the coordinates relative to the lower left corner of P.

$RMBR_P(C) = (C.xl - P.xl,\ C.yl - P.yl,\ C.xh - P.xl,\ C.yh - P.yl)$

However, the following simple analysis shows that the RMBR technique can save only about 32 bits per MBR. For simplicity, it is assumed that the coordinates of MBR are uniformly distributed in their domain and that R-tree nodes of the same height have square-like MBRs roughly of the same size. Without loss of generality, it is assumed that the domain of x coordinates has the unit length and consists of $2^{32}$ different values equally spaced.

Let f be the average fanout of leaf nodes, and let N be the total number of data objects. Then, there are roughly N/f leaf nodes, whose MBRs have the area of f/N and the side length of $\sqrt{f/N}$ along each axis. Since there are $2^{32}$ different values in the unit interval along each axis, there are $2^{32}\sqrt{f/N}$ different values in the interval with the length of $\sqrt{f/N}$. Therefore, it is possible to save $32 - \log_2(2^{32}\sqrt{f/N})$ bits or $\log_2\sqrt{N/f}$ bits for each x coordinate value. When N is one million and f is 11, about 8.2 bits are saved. By multiplying by 4, it is possible to save about 32 bits per MBR. Note that the number of saved bits does not depend on the original number of bits as long as the former is smaller than the latter.

It is possible to easily extend this analysis result such that the number of bits saved is parameterized further by the dimensionality. The extended result is $\log_2 \sqrt[d]{N/f}$ or $$(\log_2 N - \log_2 f)/d \qquad (1)$$

Formula (1) increases logarithmically in N, decreases logarithmically in f, but decreases linearly with d. Therefore, the number of saved bits mainly depends on the dimensionality. In one-dimensional space, the relative representation technique can save almost 16 bits for each scalar, but it becomes useless as the dimensionality increases.

QRMBR Technique

In addition to the RMBR technique, quantization may be performed as an additional step for further compression. In the quantized RMBR ("QRMBR") technique, the quantization step cuts off trailing insignificant bits from an RMBR whereas the RMBR technique cuts off leading non-discriminating bits from an MBR. It is shown below that quantizing an RMBR does not affect the correctness of index search, and that its small overhead by quantization is justified by a significant saving in cache misses.

Let I be a reference MBR, and let l be a desired number of quantization levels. Then, the corresponding quantized relative representation of an MBR, C, is defined as $$QRMBR_{I,l}(C) = (\phi_{I.xl,I.xh,l}(C.xl), \phi_{I.yl,I.yh,l}(C.yl), \Phi_{I.xl,I.xh,l}(C.xh), \Phi_{I.yl,I.yh,l}(C.yh)), \text{ where } \phi_{a,b,l}:$$
$$R \to \{0, \ldots, l-1\} \text{ and } \Phi_{a,b,l}: R \to \{1, \ldots, l\}$$
are $$\phi_{a,b,l}(r) = \begin{cases} 0, & \text{if } r \leq a \\ l-1, & \text{if } r \geq b \\ \lfloor l(r-a)/(b-a) \rfloor, & \text{otherwise} \end{cases}$$

$$\Phi_{a,b,l}(r) = \begin{cases} 1, & \text{if } r \leq a \\ l, & \text{if } r \geq b \\ \lceil l(r-a)/(b-a) \rceil, & \text{otherwise} \end{cases}$$

The following Lemma says that QRMBR satisfies the first of two desirable properties. Therefore, the computational overhead of QRMBR technique is the cost of compressing the query rectangle into a QRMBR for each visited node. In the present implementation, compressing an MBR into a QRMBR consumes at most about 60 instructions, which corresponds to less than 120 ns on a 400 MHz processor because of pipelining. In addition, it incurs no memory access as long as the query MBR and the MBR of the node on immediate access are cached.

Lemma 1:

Let A and B be MBRs. For any MBR I and integer l, it holds that if $QRMBR_{I,l}(A)$ and $QRMBR_{I,l}(B)$ do not overlap, A and B also do not overlap.

Proof:

It is proved by proving the contrapositive that if A and B overlap, $QRMBR_{I,l}(A)$ and $QRMBR_{I,l}(B)$ overlap. By definition, two rectangles overlap if and only if they share at least one point. Thus, A and B share at least one point. Let (x, y) denote this point. Then, the following holds.

A.xl ≤ x ≤ A.xh, A.yl ≤ y ≤ A.yh

B.xl ≤ x ≤ B.xh, B.yl ≤ y ≤ B.yh

For simplicity, the subscripts a, b, and l are omitted from the quantization functions $\phi$ and $\Phi$. Since, $\phi$ and $\Phi$ are monotonically non-decreasing functions and $\phi(r) \leq \Phi(r)$ for any r∈R, $\phi(A.xl) \leq \phi(x) \leq \Phi(x) \leq \Phi(A.xh), \phi(A.yl) \leq \phi(y) \leq \Phi(y) \leq \Phi(A.yh)$ $\phi(B.xl) \leq \phi(x) \leq \Phi(x) \leq \Phi(B.xh), \phi(B.yl) \leq \phi(y) \leq \Phi(y) \leq \Phi(B.yh)$ Thus, $QRMBR_{I,l}(A)$ and $QRMBR_{I,l}(B)$ share at least the point ($\phi(x), \phi(y)$). Hence, they overlap, which completes the proof.

Since it is generally not possible to recover the original coordinates of an MBR from its QRMBR, there is the possibility of incorrectly determining the overlap relationship between two MBRs. However, Lemma 1 guarantees that there is no possibility of saying two actually overlapping MBRs do not overlap. Thus, the QRMBR technique does not miss a data object that satisfies a query.

However, there is still a possibility that two actually non-overlapping MBRs may overlap. This means that the result of index search may contain false hits that have to be filtered out through a subsequent refinement step. This refinement step is needed for most multidimensional index structures because it is often the case that MBRs are not exact keys of data objects. Thus, requiring the refinement step itself is not an overhead, but the number of false hits can be. The number of false hits can be made negligibly small, such as fewer than one percent, by choosing the quantization level properly.

CR-tree of the Present Invention

FIGS. 3A through 3G show the procedures relating to the CR-tree of the present invention. The two main differences between the algorithms of CR-tree and those conventional R-tree variants are: the CR-tree stores QRMBRs in the nodes, and maintains them as its MBR grows or shrinks.

Figure 3A:
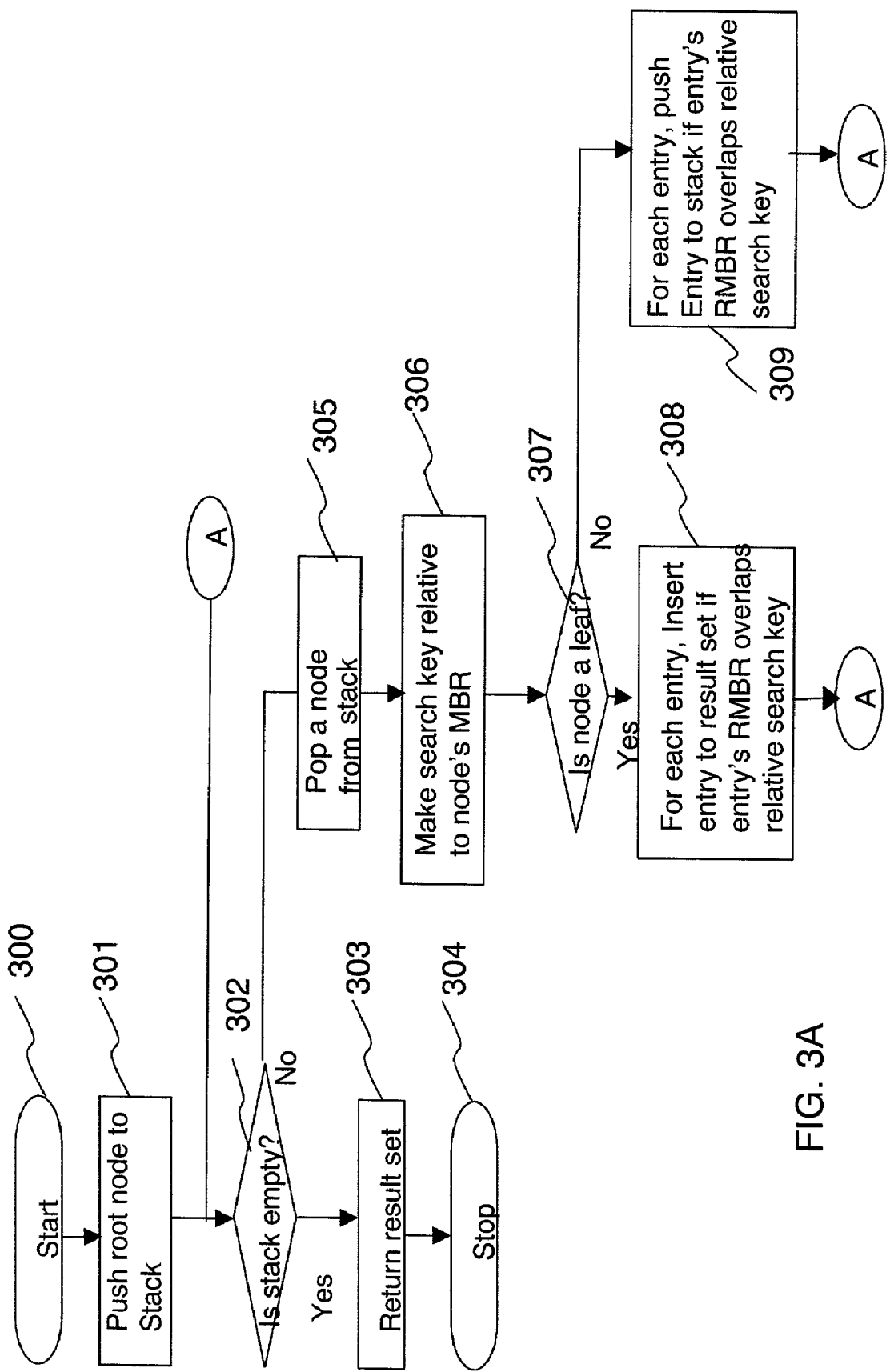
FIGS. 3A through 3G are flow charts relating to manipulation of the CR-tree.

FIG. 3A shows the flow chart of the search procedure, which is similar to those used in other R-tree variants, except that the CR-tree needs to compare a query rectangle to QRMBRs in the nodes. Instead of recovering MBRs from QRMBRs, the CR-tree transforms the query rectangle into the corresponding QRMBR using the MBR of each node as the reference MBR. Then, it compares two QRMBRs to determine whether they overlap.

Search Procedure:

Given a CR-tree and a query rectangle Q, find all index records whose QRMBRs overlap Q.

1. Push the root node to the initially empty stack S (step 301)

2. If S is empty (step 302), return the result set (step 303) and stop (step 304).

3. If S is not empty (step 302), pop a node N from S (step 305) and set R to be $QRMBR_{N.MBR,l}(Q)$ (step 306).

4. If N is not a leaf node (step 307), check each entry E to determine whether E.QRMBR overlaps R. If so, push E.ptr to S (step 308).

5. If N is a leaf node (step 307), check all entries E to determine whether E.QRMBR overlaps R. If so, add E.ptr to the result set (step 309).

6. Repeat from step 2

Figure 3B:
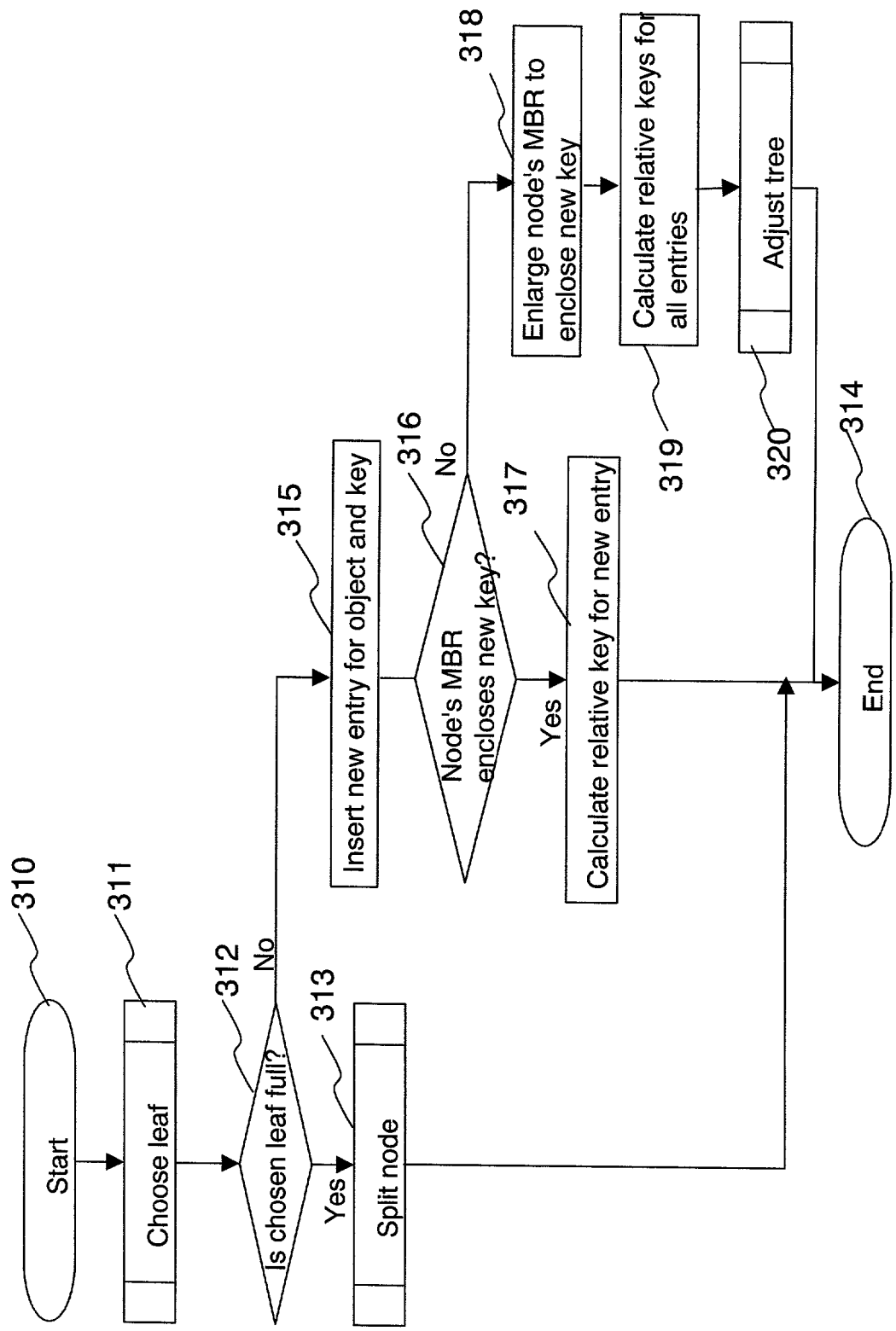

FIG. 3B shows the flow chart of the Insert procedure. The Insert procedure insert a new data object O whose MBR is C into a CR-tree by invoking the ChooseLeaf and Install procedures. The SplitNode and AdjustTree procedures may also be invoked if needed. The Install procedure installs a pair of an MBR C and a data object pointer p in a node N by enlarging N.MBR such that it encloses C and by making an entry of $(QRMBR_{N.MBR,l}(C),p)$ and appending it to N. If N.MBR has been enlarged, recalculate all the QRMBRs in N by accessing their actual MBRs and invoke the AdjustTree Procedure passing N.

To insert a new data object (step 315), the CR-tree descends itself from the root by choosing the child node that needs the least enlargement to enclose the new key of the object MBR. If the node's MBR enclose the new key (step 316), a relative key is calculated for the new entry (step 317). If the node's MBR does not enclose the new key (step 316), the node's MBR must be enlarged to enclose the new key (step 318).

When visiting an internal node to choose one of its children, the object MBR is first transformed into the QRMBR using the node MBR as the reference MBR. Then, the enlargement is calculated between a pair of QRMBRs.

Relative keys are calculated for all entries (step 319). When a leaf node is reached, the node MBR is first adjusted such that it encloses the object MBR. Then, an index entry for the data object is created in the node. If the node MBR has been adjusted, the QRMBRs in the node are recalculated because their reference MBR has been changed.

If the node overflows (step 312), it is split (step 313) and the split propagates up the tree.

Figure 3C:
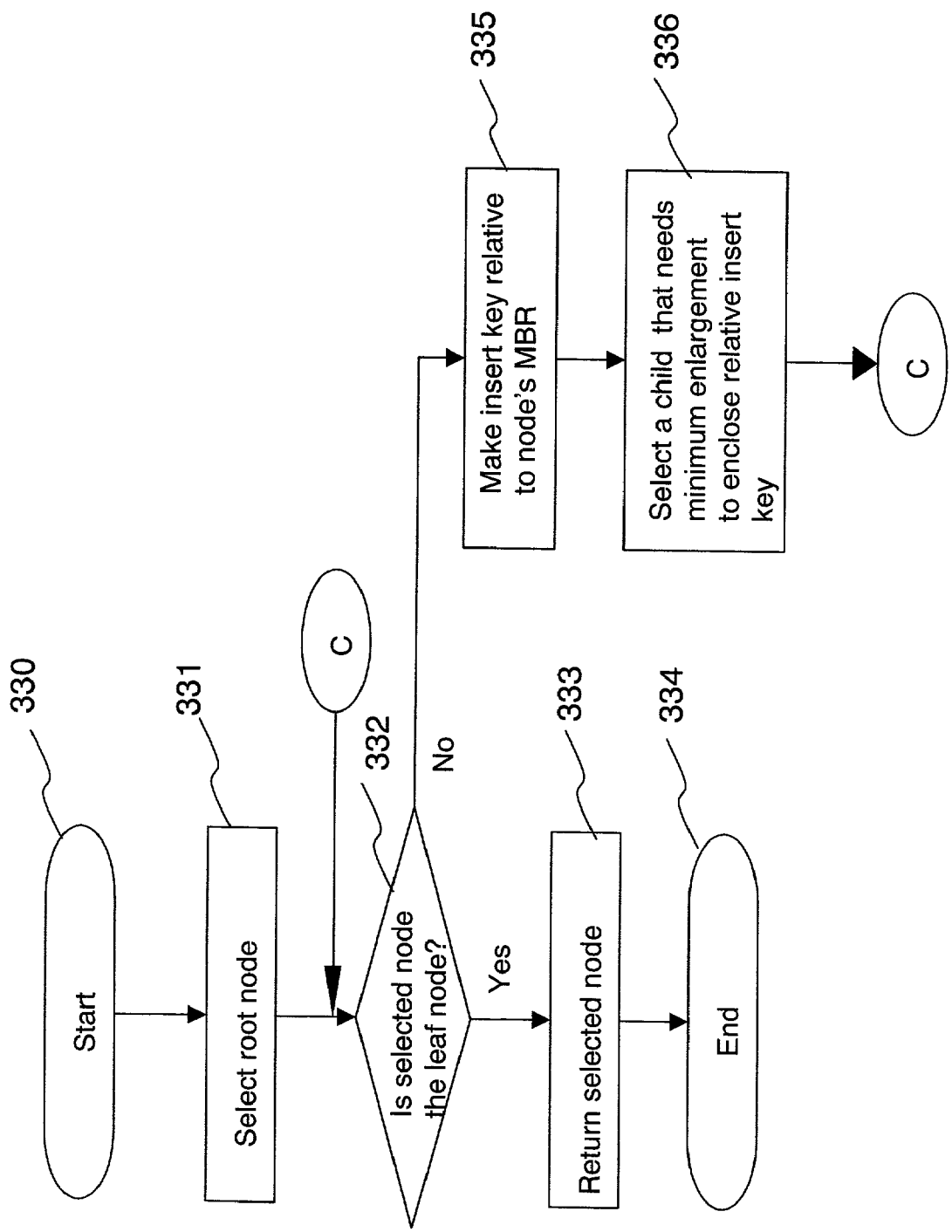

FIG. 3C shows the flow chart of the ChoosLeaf procedure that select a leaf node in which to place a new MBR C descending a CR-tree from the root. Starting from a root node, if the selective node is not a leaf node (step 332), the insert key is made relative to the node's MBR (step 335) and a child node is selected that needs the minimum enlargement to enclose the relative insert key (step 336). The process is repeated until the leaf node is reached (step 333).

Figure 3D:
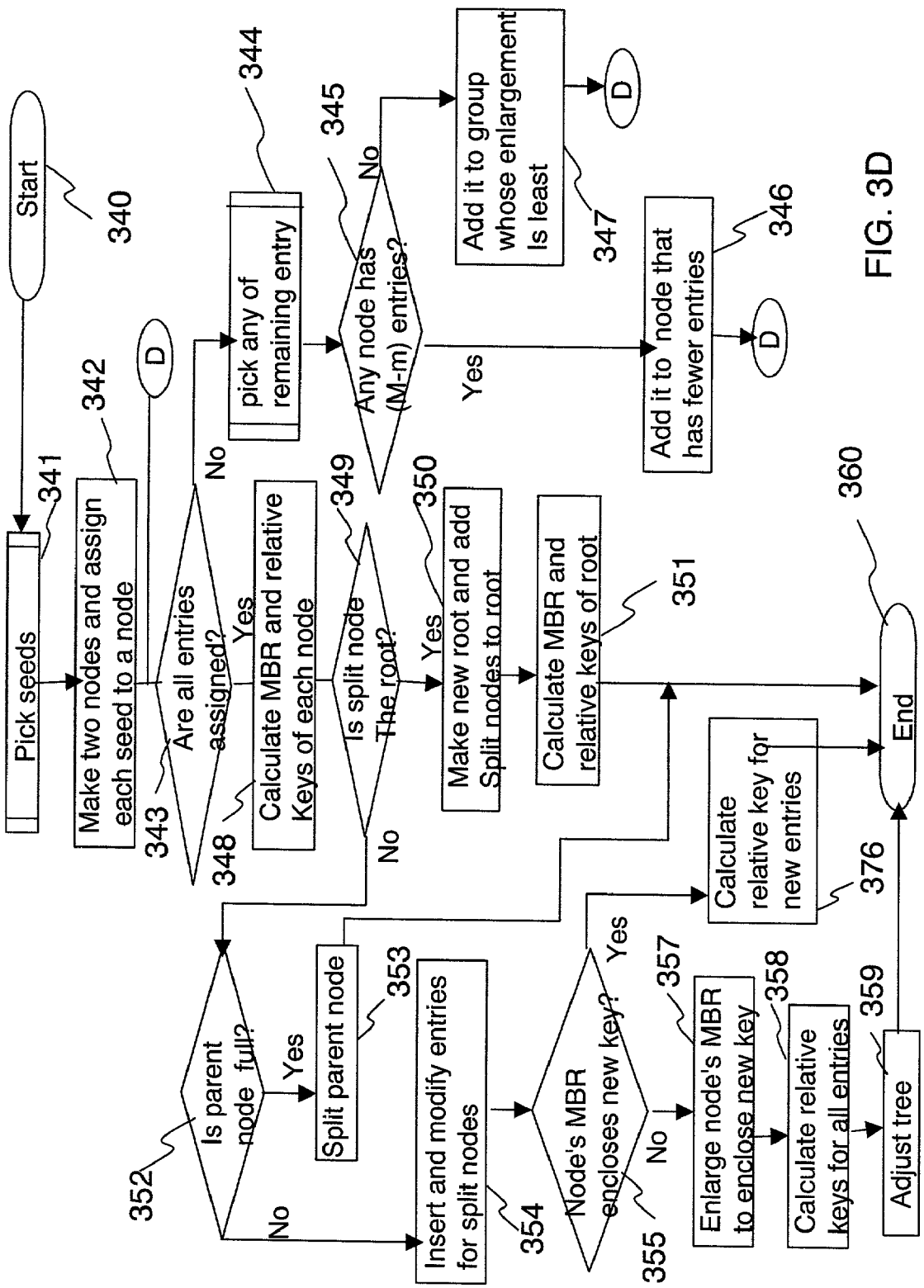

FIG. 3D shows the flow chart of the SplitNode procedure that splits a node into two based on the linear split algorithm used for an R-tree. The QRMBRs in the nodes need to be recalculated according to their MBR. Splitting can be done using other split algorithms used for R-tree and its variants, such as the quadratic split algorithm.

The pair of farthest entries is chosen as seeds (step 341). Two nodes are made and each seed is assigned to a node (step 342). Pick any of remaining entries (step 344) and assign the entry to the node that requires the least enlargement of its MBR to include the chosen entry (step 347). If one node has (M-m) entries (step 345) where M is the maximum number of entries in a node and m is a predefined minimum number of entries in a node, all the remaining entries should be assigned to the other node (step 346). This step makes each node have at least m entries. If all the entries are assigned (step 343), the MBR of each node is obtained, and the relative keys in each node are calculated (step 348).

If the node under split is the root, a new root is made and two split nodes are added to the root as its children (step 349). MBRs and relative keys of the root are recalculated (step 351). If the node under split is not the root and if the parent node is full (step 352), the parent node is split (step 353). If the parent node is not full (step 352) and if the parent node's MBR enclose the new key (step 355), relative keys are recalculated only for two new entries (step 376). If the parent node's MBR does not enclose the new key (step 355), the parent node's MBR is enlarged to enclose the new key (step 357), and the relative keys in the node are recalculated for all entries (step 358), and the tree is adjusted (step 359).

Figure 3E:
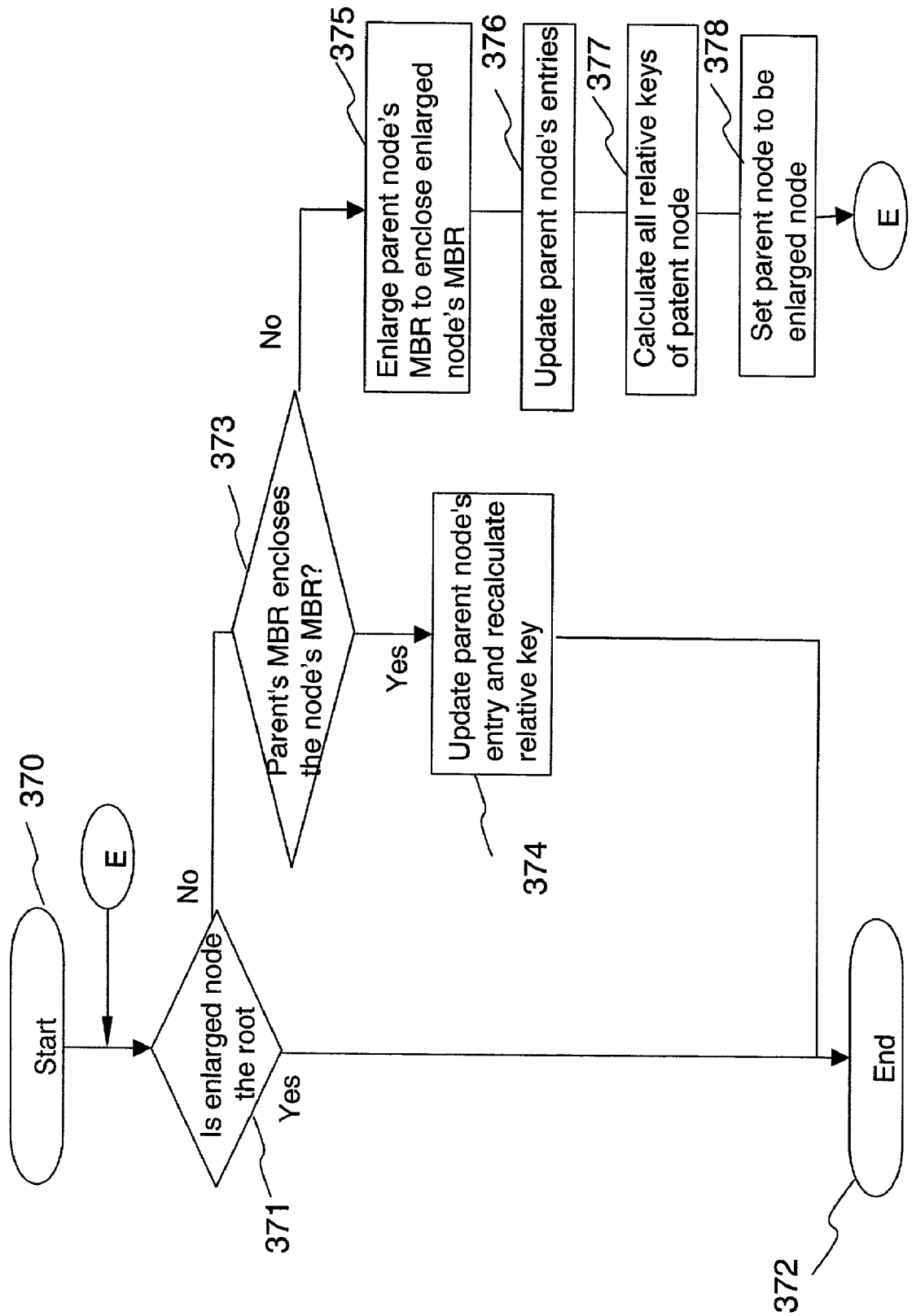

FIG. 3E shows the AdjustTree procedure that ascends from a leaf node L up to the root, adjusting MBRs of nodes and propagating node splits as necessary. When a node MBR has been adjusted, the QRMBRs in the node are recalculated. First, it is checked whether the enlarged node is the root (step 371). If the enlarged node is not the root and if the parent node's MBR enclose the node's MBR (step 373), the parent node's entries are updated and the relative keys are recalculated (step 374). If the parent node's MBR does not enclose the node's MBR (step 373), the parent node's MBR is enlarged to enclose the enlarged node's MBR (step 375). The parent node's entries are updated and all relative keys of the parent node are recalculated (step 377), and the parent node is set to be an enlarged node (step 378).

Figure 3F:
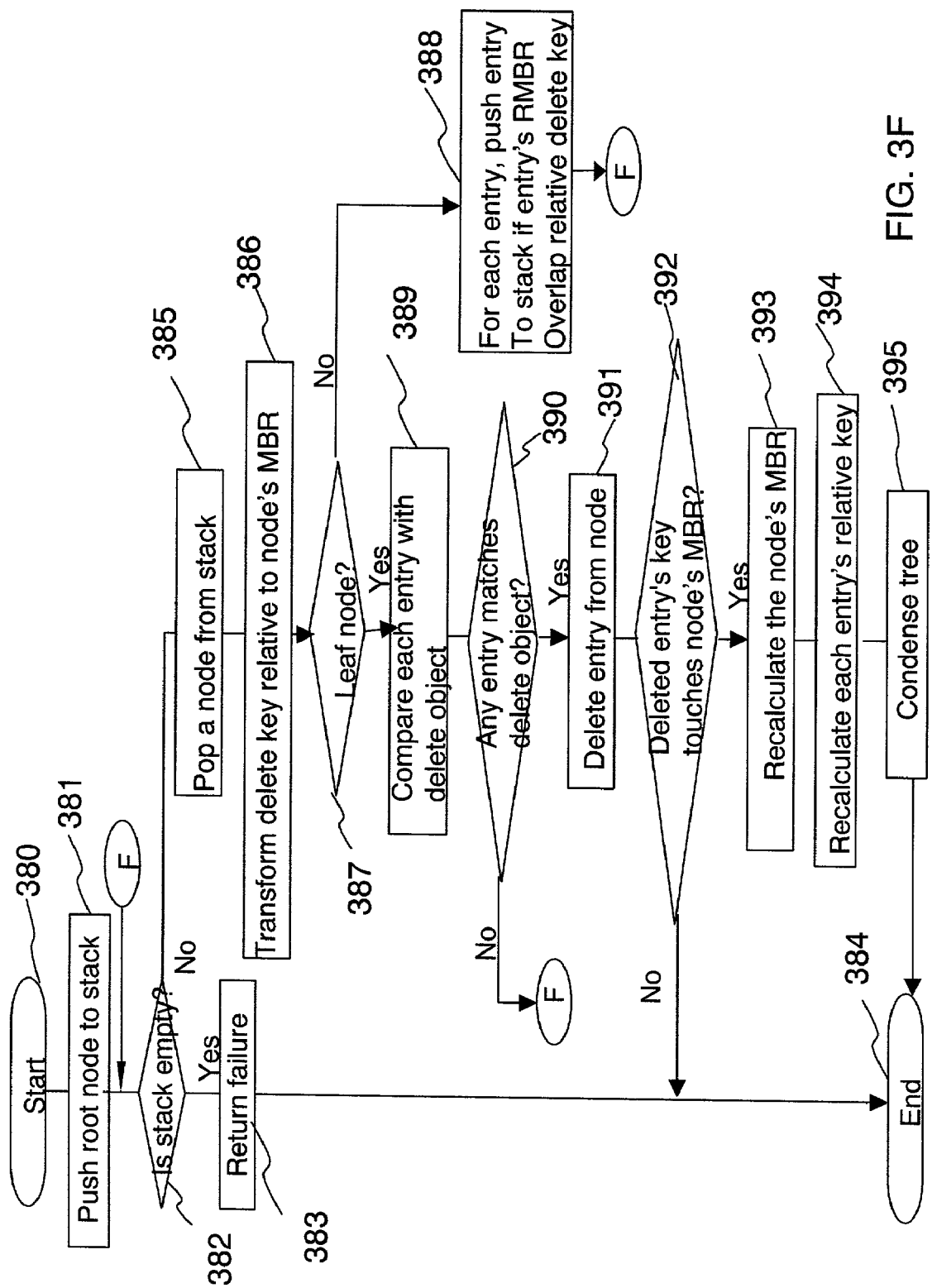

FIG. 3F shows the flow chart of the Delete procedure that removes index record E from a CR-tree. The delete key is transformed to be relative to the node's MBR (step 386). If the node is a leaf node (step 387), each entry within the node is compared with the delete object (step 389). If any entry matches the delete object (step 390), the entry is deleted from the leaf node (step 391). If the deleted entry's key touches the leaf node's MBR (step 393), each entry's relative key is recalculated (step 394), and the tree is condensed (step 395).

Figure 3G:
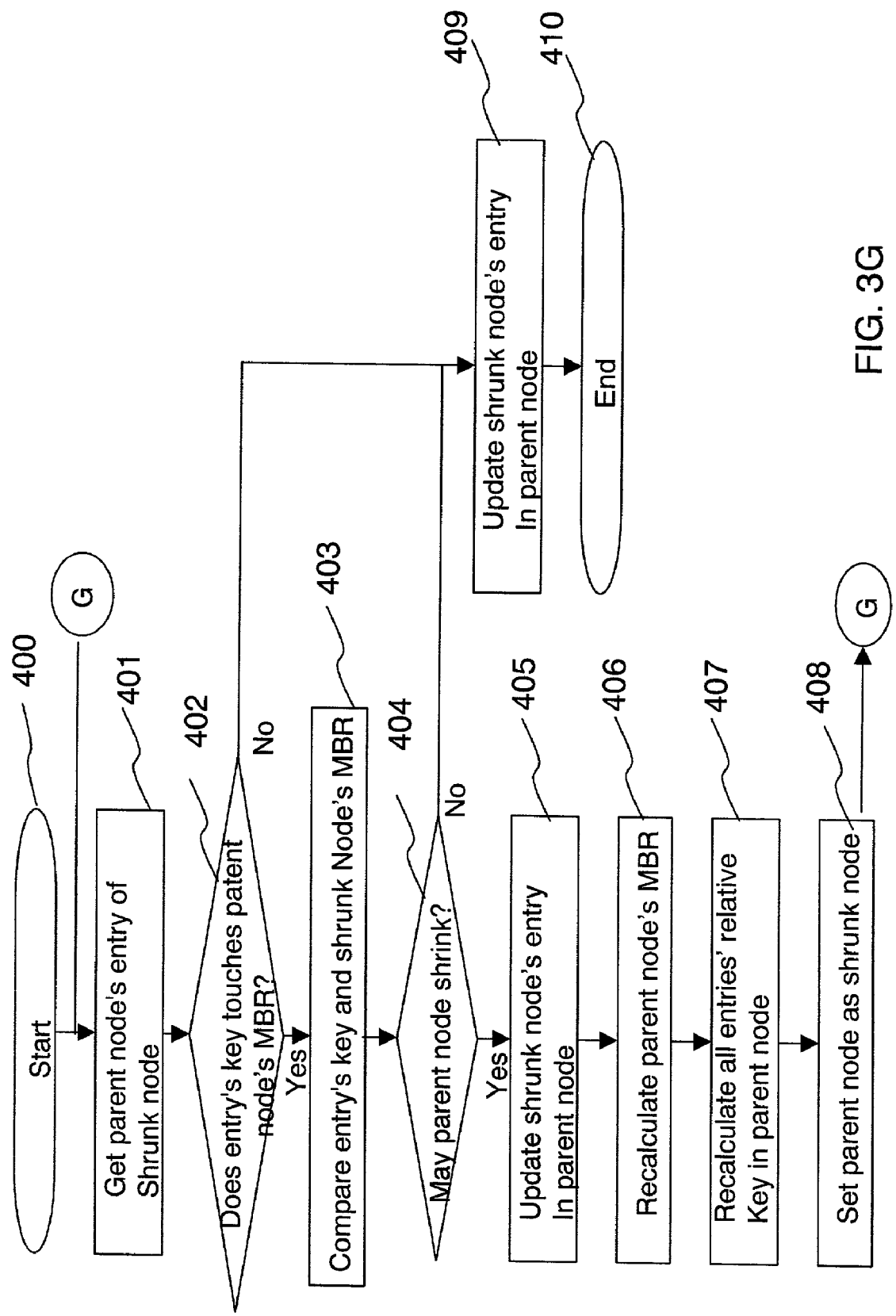

FIG. 3G shows the flow chart of the CondenseTree procedure. If a leaf node L from which an entry has been deleted leaving the leaf node with few entries as a result, the CondenseTree procedure eliminates the node and relocates all its entries. Node elimination is propagated upward as necessary. Adjust all MBRs of the nodes on the path to the root, making them smaller if possible. When a node's MBR has been adjusted, the QRMBRs in the node is recalculated.

First, the patent's entry of a shrunk node is found step (4011). If the entry's key does not touch the patent node's (step 402), the shrunk node's entry in the parent node is updated (step 409) and stopped (step 410). If the entry's key touches the parent node's MBR (step 402), the entry's key and the shrunk node's MBR are compared (step 403). If the parent node may not be shrunk (step 404), the shrunk node's entry in the parent node is updated (step 405). But, if the parent node can be shrunk (step 404), the shrunk node's entry in the parent node is updated (step 405). The parent node's MBR is recalculated (step 406) and the relative key of each entry in the parent is also recalculated (step 407). The parent node is set as a shrunk node (step 408).

Those skilled in the art appreciate that any of the deletion algorithms used in the R-tree and the R*-tree may also be used with a slight modification.

Bulk Loading

Bulk loading into a CR-tree is no different from that into other R-tree variants. As long as QRMBRs are correctly maintained, existing bottom-up loading algorithms can be used directly.

CR-tree Variants

Figure 4A:
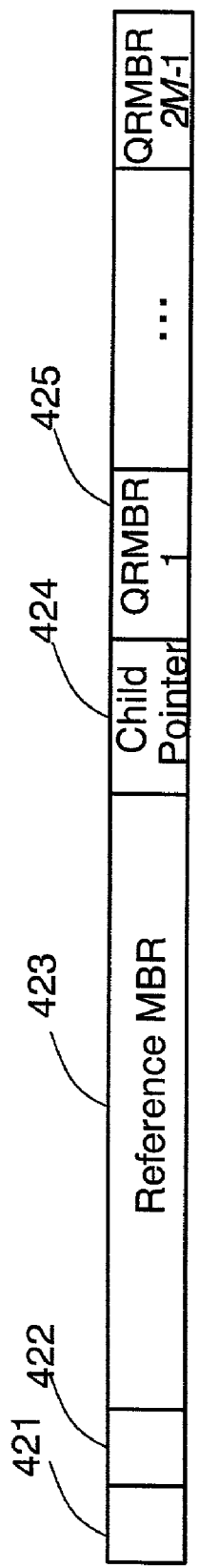
FIGS. 4A through 4C are illustrations of the data structures changes for three CR-tree variants.
Figure 4B:
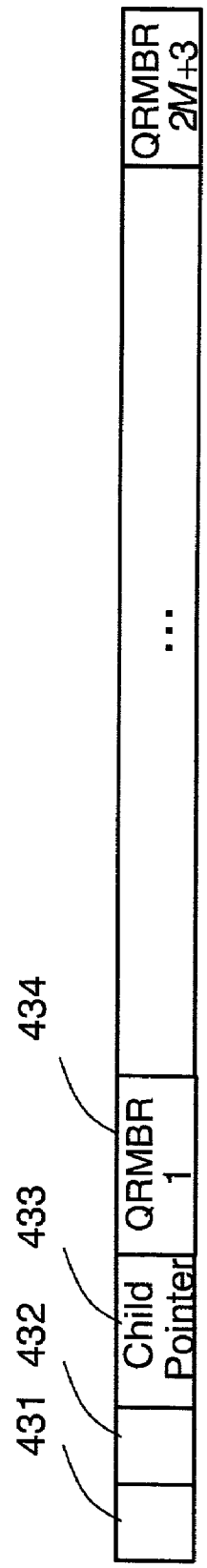
Figure 4C:
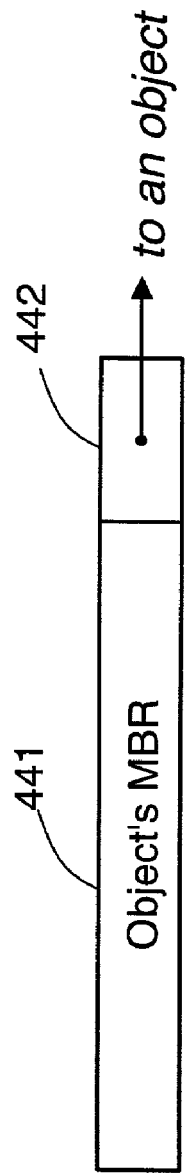

FIGS. 4A, 4B and 4C show three variants of the CR-tree of the present invention, namely, the PE CR-tree, the SE CR-tree, and the FF CR-tree.

FIG. 4A shows the first variation, called the PE ("pointer-eliminated") CR-tree, that eliminates pointers to child nodes from internal nodes except the pointer of the first entry, similar to the CSB+-tree. Each node includes a field 421 for indicating whether the node is a leaf node or a non-leaf (internal) node, a field 422 for indicating the number of entries in the node, a field 423 for storing a reference MBR, a field 424 for storing a pointer to a child node, and fields such as 425 for storing QRMBR.

The PE CR-tree widens the CR-tree significantly by eliminating most of the pointers because the key size of the CR-tree is smaller than the R-tree, for example. If the QRMBR size is four bytes, this extension doubles the fanout of internal nodes when the pointer is 4 bytes.

It is noted that the pointers to data objects stored in leaf nodes can rarely be eliminated. When the average fanout of both internal and leaf nodes is 10, the number of internal nodes is about one ninth of that of leaf nodes. Therefore, the overall increase of fanout is only about 10%.

On the other hand, since the pointer elimination technique works by storing the child nodes with the same parent consecutively, splitting a node becomes expensive. The new node created by a split has to be stored consecutively with its siblings, and this often requires allocating a new space and moving the siblings into the space.

FIG. 4B shows the second variation, called the SE ("space efficient") CR-tree that removes the reference MBR from nodes of the basic CR-tree. It makes use of the fact that the reference MBR of each node can be obtained from the matching entry in its parent node.

The figure shows a structure of a node except the root note. It includes a field 431 for indicating whether the node is a leaf or non-leaf (internal) node, a field 432 for indicating the number of entries in the node, a field 433 for storing a pointer to a child node, and fields such as 434 for storing QRMBR. Note that the reference MBR is not present in each node, except the root node.

The SE CR-tree allows the fanout of internal nodes to increase by four and that of leaf nodes by two when the MBR size is 16 bytes and the QRMBR size is 4 bytes. This increase in fanout could be larger than the increase obtained in the PE CR-tree when the size of a node is as small as one or two cache blocks.

FIG. 4C illustrates the third extension to the basic CR-tree, called the FF ("false-hit free") CR-tree, that decreases the fanout of leaf nodes compared to the above two extensions that increases the fanout of leaf nodes. Since the QRMBR technique is a lossy compression scheme, the search result can be a superset of the actual answer for a given query. This can be avoided if the QRMBR technique is applied only to internal nodes and store original, non-relative MBRs in leaf nodes.

The figure shows the structure of a leaf node where object's MBR 441 is stored in the original, non-relative format, together with a pointer to an object 442. The FF CR-tree is useful when the subsequent refinement step is extremely expensive. For example, when complex boundary polygons of administrative districts are indexed by their MBRs, the refinement step of comparing the given query shape with the actual shape of data objects obtained by searching an index can be expensive.

Table 1 shows the space requirements for the various embodiments of index structures according to the present invention, where N is the number of leaf node entries and S is the size of a node in bytes. It is assumed that the size of MBR is 16 bytes, the size of QRMBR is 4 bytes, and the size of the pointer is 4 bytes. The typical index sizes are calculated when N is 1,000,000 and S is 128 assuming that the nodes are 70% full. Note that the PE R-tree is an extension of R-tree as a result of applying the pointer elimination technique. The internal node space is calculated by dividing the leaf space by the average fanout of internal nodes minus one. This analysis shows that the PE CR-tree is not so different from the CR-tree in terms of the space requirement and the PE R-tree is no different from the R-tree.

query MBRs are hyper-squares. It is further assumed that the R-tree nodes of the same height have square-like MBRs roughly of the same size like other analytical work. Mathematica 3.0 was used to perform the numerical computation needed to compare the analytical results visually.

Let h denote the height or level of a node assuming that the height of leaf nodes is one. Let $M_h$ denote the number of nodes with the height of h. From the above assumption, $$M_h = \left\lceil \frac{N}{f^h} \right\rceil$$

Let $a_h$ denote the average area that a node of height h covers. Then, $a_h$ is $1/M_h$. Using the Minkowski sum technique, the probability that a node of height h overlaps a given query rectangle is $(\sqrt[d]{s}+\sqrt[d]{a_h})^d$, where s denotes the size of the query rectangle. Then, the number of height-h nodes that overlap the query rectangle is $M_h(\sqrt[d]{s}+\sqrt[d]{a_h})^d$ or $$\left(1+\sqrt[d]{\left\lceil \frac{N}{f^h} \right\rceil \cdot s}\right)^d.$$

By summing this equation from the leaf to the root, the total number of nodes accessed in R-trees is $$1 + \sum_{h=1}^{\lceil \log_f N \rceil - 1} \left(1+\sqrt[d]{\left\lceil \frac{N}{f^h} \right\rceil \cdot s}\right)^d \quad (1)$$

On the other hand, the CR-tree compares QRMBRs in order to determine whether to visit a node or not while the R-tree compares MBRs. Since a QRMBR is larger than its original MBR by the length of a quantization cell on average, the number of node accesses increases a bit in the CR-tree.

Let l denote the number of quantization levels. Then, each node has $l^d$ quantization cells, and the side length of each cell is $\sqrt[d]{a_h}/l$ where h denotes the height of the node. Since whether to visit a child node is determined by comparing the QRMBR of the query rectangle and the stored QRMBR of

TABLE 1

| Tree type | Maximum fanout | | Node space | | Typical index size |
|---|---|---|---|---|---|
| | Internal | Leaf | Internal | Leaf | |
| R-tree | m | m | NS/0.7 m(0.7 m − 1) | NS/0.7 m | 38.15 MB |
| PE R-tree | 1.25 m | m | NS/0.7 m(0.875 m − 1) | NS/0.7 m | 35.90 MB |
| CR-tree | 2.5 m − 4 | 2.5 m − 4 | NS/(1.75 m − 2.8)(1.75 m − 1.8) | NS/(1.75 m − 2.8) | 17.68 MB |
| PE CR-tree | 5 m − 5 | 2.5 m − 4 | NS/(1.75 m − 2.8)(3.5 m − 2.5) | NS/(1.75 m − 2.8) | 16.71 MB |
| SE CR-tree | 5 m − 1 | 2.5 m − 2 | NS/1.75 m(3.5 m − 0.7) | NS/(1.75 m − 1.4) | 14.07 MB |
| FF CR-tree | 2.5 m − 4 | m | NS/0.7 m(1.75 m − 2.8) | NS/0.7 m | 32.84 MB |

Analytical Results

Without loss of generality, a data domain of unit hyper-square is assumed. For simplicity, it is assumed that data objects are uniformly distributed in the domain, and the the child node, the probability to visit a child node is $(\sqrt[d]{s}+\sqrt[d]{a_h}/l+\sqrt[d]{a_h}/l)^d$. By multiplying by $M_h$ and summing from the leaf to the root, the total number of nodes accessed in CR-trees is $$1 + \sum_{h=1}^{\lceil \log_f N \rceil - 1} \left(1 + \sqrt[d]{\lceil \frac{N}{f^h} \rceil \cdot s} + \sqrt[d]{\lceil \frac{N}{f^{h+1}} \rceil \cdot s} / l\right)^d \quad (2)$$

Figures 5A, 5B:
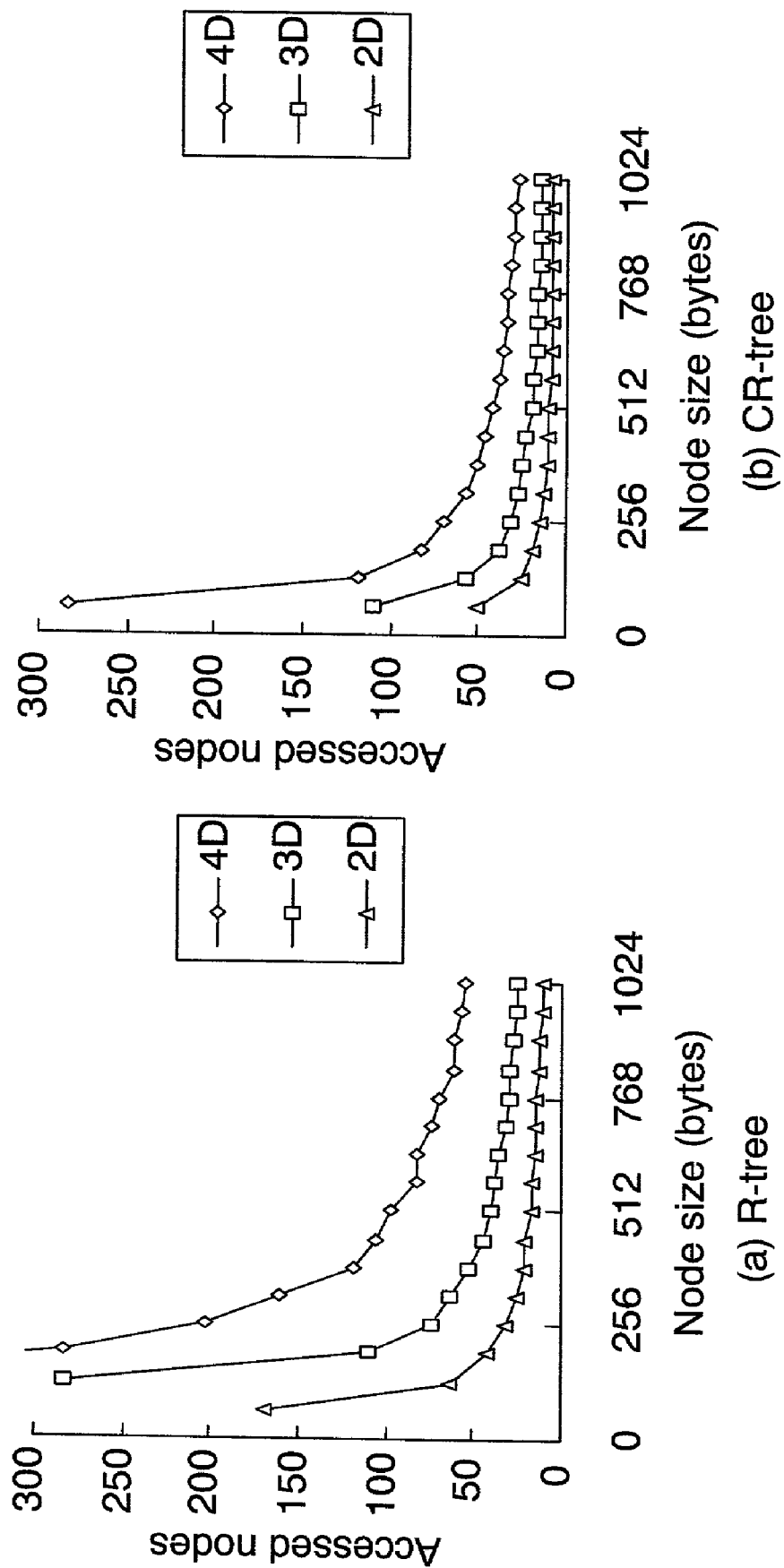
FIGS. 5A and 5B are graphs showing the node accesses in R-trees and CR-trees.

FIGS. 5A and 5B plot equations (2) and (3) for the cardinality of one million and the query selectivity of 0.01%. It is assumed that the pointer size is 4 bytes and that each node is 70% full. It is also assumed that the MBR size is 16 bytes in 2 dimension ("2D") and increases linearly with increasing dimension. The QRMBR size is assumed to be a one-fourth of the MBR size.

The analytical result shows that the number of accessed nodes decreases with increasing the node size. The decreasing rate is initially large, but it becomes smaller as the node size increases. For all the node sizes and all the three dimensionality, the CR-tree surpasses the R-tree by more than twice.

Number of Cache Misses

The number of cache misses can easily be calculated by multiplying equations (2) and (3) by the number of cache misses that a single node access incurs. To obtain the results, the equations (2) and (3) were multiplied by S/64, where S is the node size in bytes.

Figure 6B:
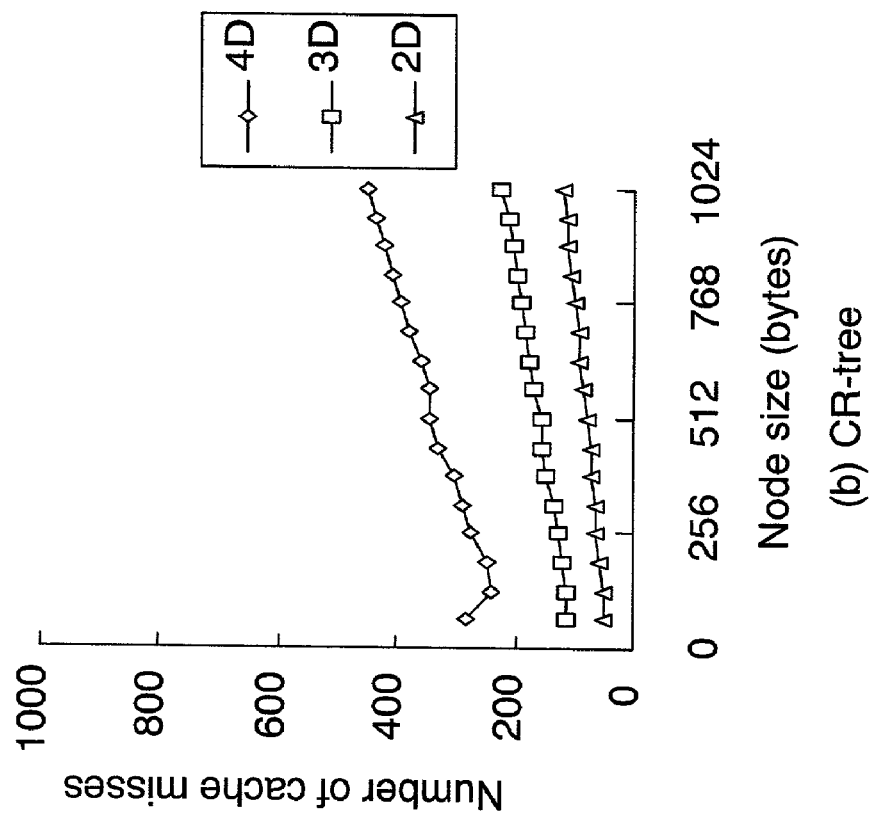
FIGS. 6A and 6B are graphs showing the cache misses in R-trees and CR-trees.
Figure 6A:
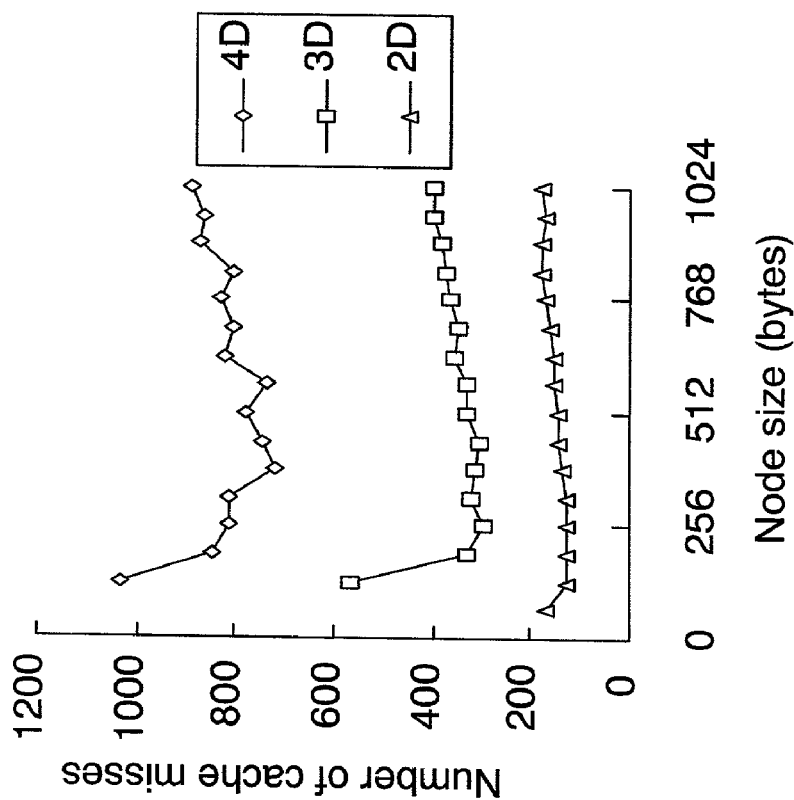

FIGS. 6A and 6B show the calculated number of cache misses for the same configurations as FIGS. 64 and 4B. The analytical results show that as the node size grows, the number of cache misses approaches quickly to a minimum, and then increases slowly. In terms of cache misses, the CR-tree outperforms the R-tree rather significantly, by up to 4.3 times.

FIG. 6A exhibits a sawtooth-like pattern showing the number of cache misses decreasing abruptly at certain node sizes while generally increasing with the node size. Such bumps occur when the height of tree becomes smaller. For example, the 4D R-tree has the height of 7 when the node size is 448 bytes or 512 bytes, but its height becomes 6 when the node size is 576 bytes. In other words, such bumps occur when the gain due to the decrease of height surpasses the overhead due to the increase of node size.

Although the optimal one-dimensional node size in terms of the number of cache misses is shown to be the cache block size mentioned above, FIGS. 6A and 6B shows that this choice of node size is not optimal in multidimensional cases as discussed above.

Figures 7A, 7B:
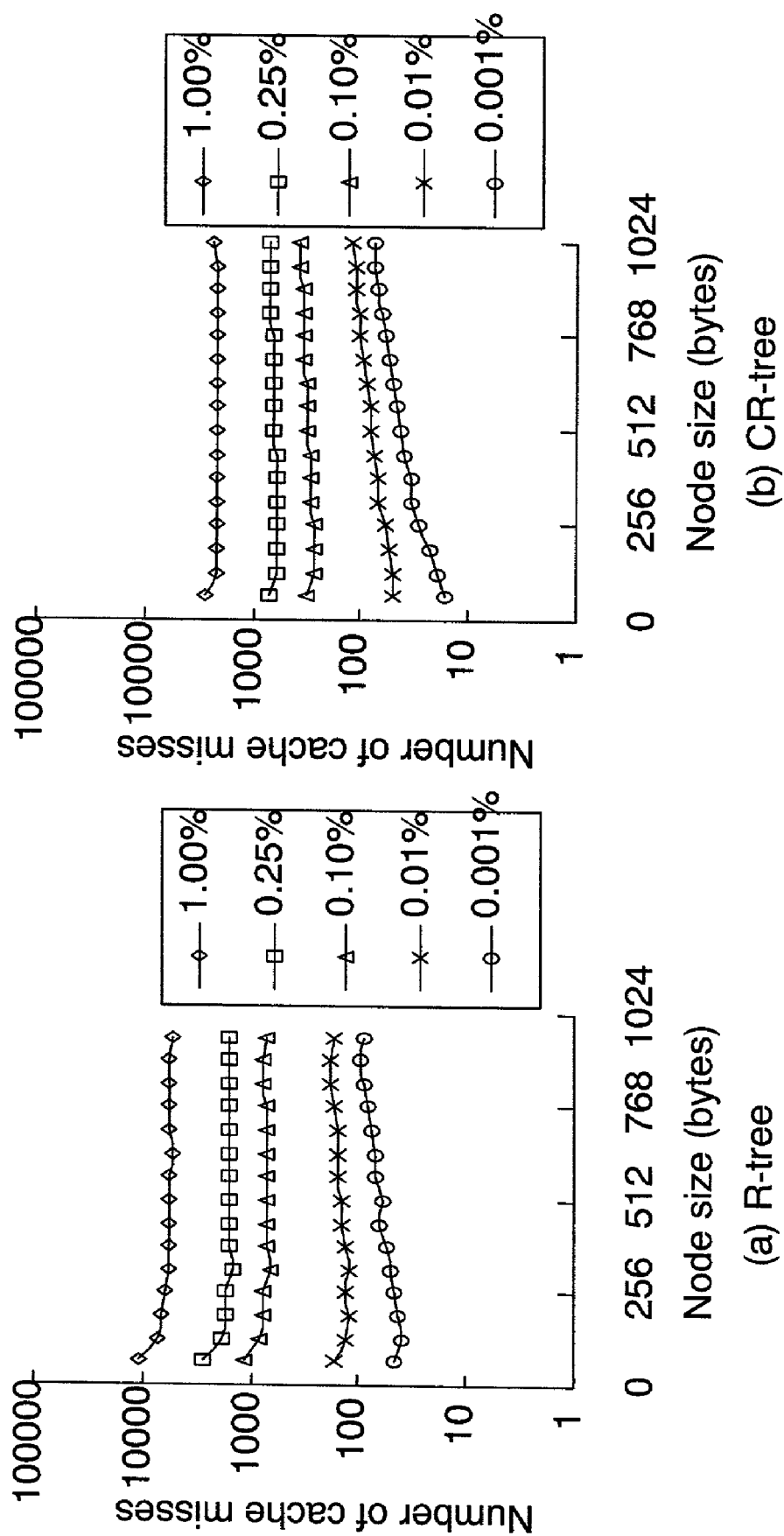
FIGS. 7A and 7B are graphs showing the increase of optimal node size with query selectivity in 2D R-trees and CR-trees.

FIGS. 7A and 7B compare the number of cache misses calculated with varying query selectivity ranging from 0.001% to 1%. It is observed that the optimal node size increases with increasing the query selectivity in both R-trees and CR-trees.

FIG. 7A shows that the optimal node size increases in the order of 128B (bytes), 192B, 320B, 640B, and 960B as the query selectivity increases. FIG. 7B shows that the optimal node size increases in the order of 64B, 128B, 128B, 256B, and 320B as the query selectivity increases. The optimal node size increases in the same way as the cardinality and the dimensionality increase.

Ratio of False Hits By Quantization

Each quantization cell of a leaf node has the area of $f/l^d N$ and the side length of $\sqrt[d]{f/l^d N}$ along each axis, and the probability that the QRMBRs of the query MBR and the object MBR overlap is $(\sqrt[d]{s} + \sqrt[d]{a} + 2\sqrt[d]{f/l^d N})^d$.

Therefore, the probability that a false hit occurs is $(\sqrt[d]{s} + \sqrt[d]{a} + 2\sqrt[d]{f/l^d N})^d - (\sqrt[d]{s} + \sqrt[d]{a})^d$. Dividing by $(\sqrt[d]{s} + \sqrt[d]{a})^d$, the ratio of false hits incurred by quantization to actual answers is $$(1 + 2\sqrt[d]{f/l^d N}/(\sqrt[d]{s} + \sqrt[d]{a}))^d - 1. \quad (3)$$

Figures 8A, 8B:
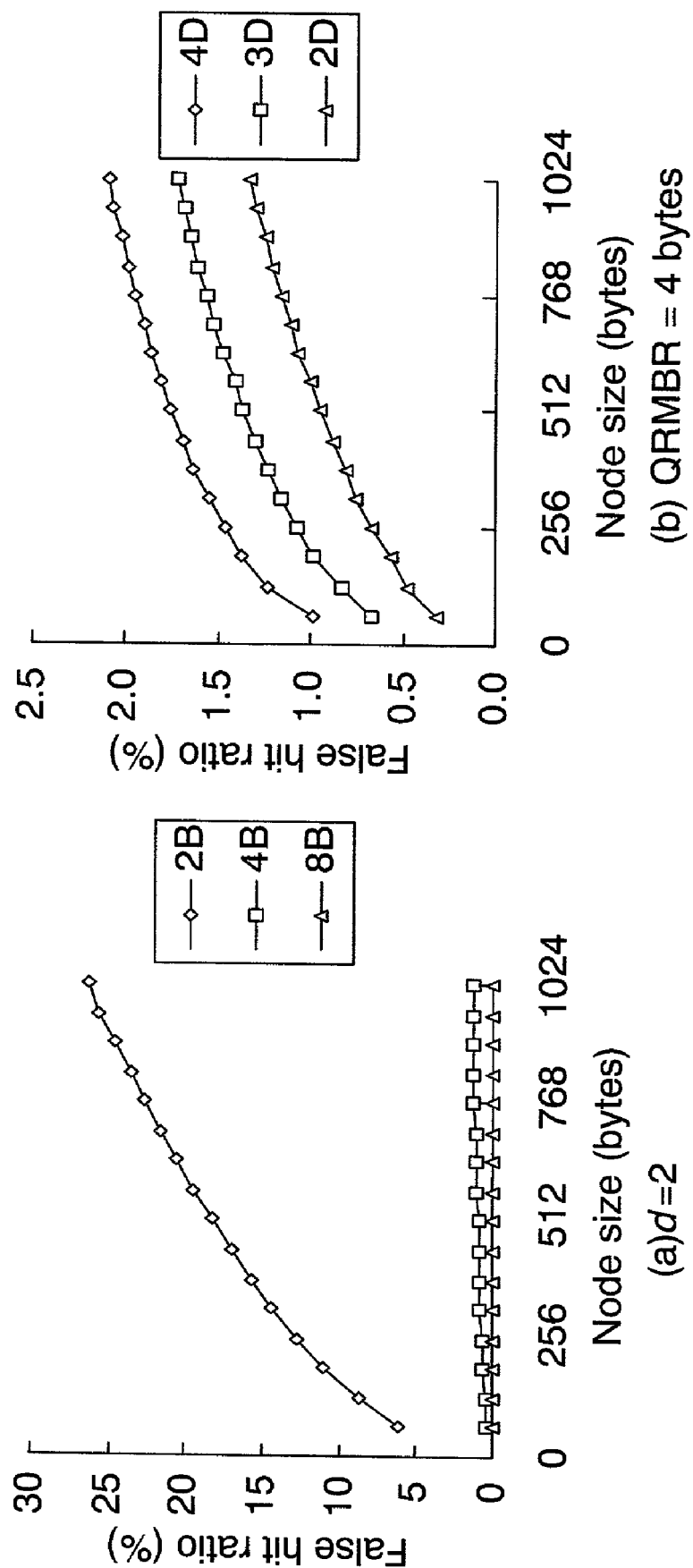
FIGS. 8A and 8B are graphs showing the false hit ratio by QRMBR size and dimensionality.

FIGS. 8A and 8B plot equation (4) when the cardinality is one million and the query selectivity is 0.01%. Here, it is assumed that the pointer size is 4 bytes and that each node is 70% full. FIG. 8A shows the false hit ratio in the 2D CR-tree for three different QRMBR sizes: 2 bytes, 4 bytes, and 8 bytes, and FIG. 8B shows the false hit ratio for three different dimensionality: 2 dimensions ("2D"), 3D, and 4D. The false hit ratio increases with both the node size and the dimensionality. Using QRMBRs of 4 bytes incurs around one false hit in this configuration, but it saves tens of or hundreds of cache misses as shown in FIGS. 6A and 6B.

Expremental Results

To confirm the merits of the CR-tree and its variants of the present invention, a series of experiments were conducted on a SUN UltraSPARC platform (400 MHz CPU with 8 MB L2 cache) running Solaris 2.7.

Six index structures were implemented: the original R-tree, the PE R-tree, the CR-tree, the PE CR-tree, the SE CR-tree, and the FF CR-tree. A bulk-loading algorithm was also implemented. The size of nodes was changed from 64 bytes to 1024 bytes inside the index structures implemented. 16-byte MBRs were used and the size of QRMBRs was changed from 2 bytes to 8 bytes. Unless specified, the default size of QRMBRs is 4 bytes, and the nodes are 70% full.

Two synthetic data sets were generated, which consist of one million small rectangles located in the unit square. One is uniformly distributed in the unit square while the other has a Gaussian distribution around the center point (0.5, 0.5) with the standard deviation of 0.25. The average side length of rectangles is set to be 0.001.

Search Performance

The search performances of various index trees of the present invention were compared in terms of the wall-clock time spent processing a two-dimensional region query. 10,000 different query rectangles of the same size are generated, whose center points are uniformly distributed. The size of query rectangles was changed from 0.01% of the data space to 1%. Since the data space is the unit square, the query selectivity is roughly same as the size of a query rectangle.

Figure 9B:
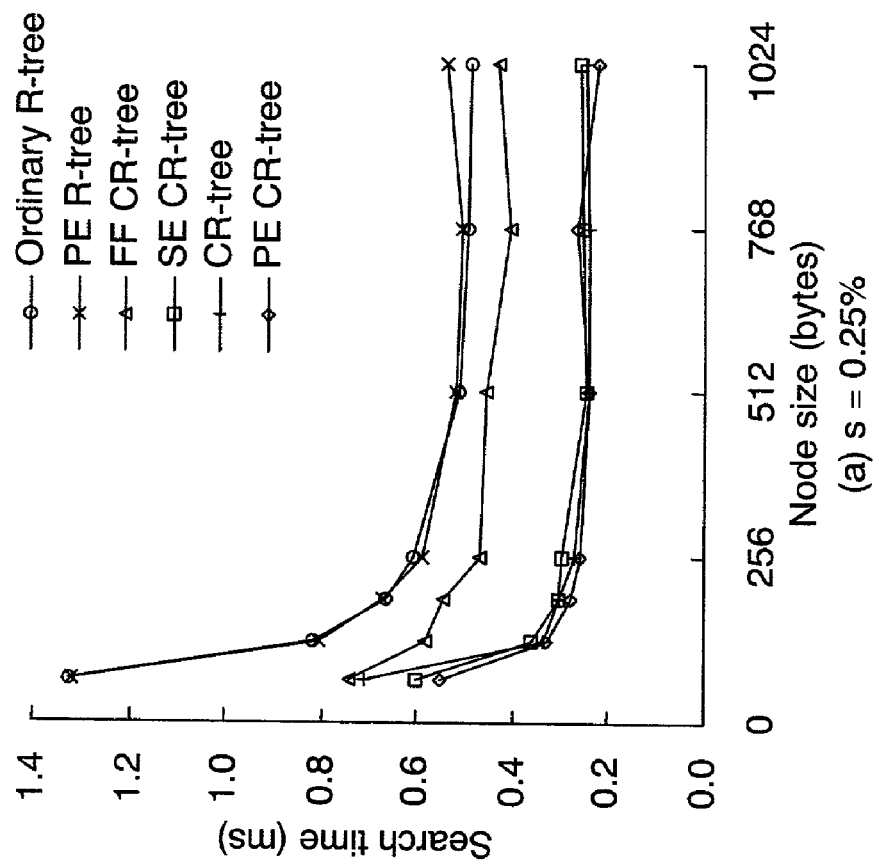
FIGS. 9A and 9B are graphs showing the search performance of bulk-loaded 2D trees with a uniform data set.
Figure 9A:
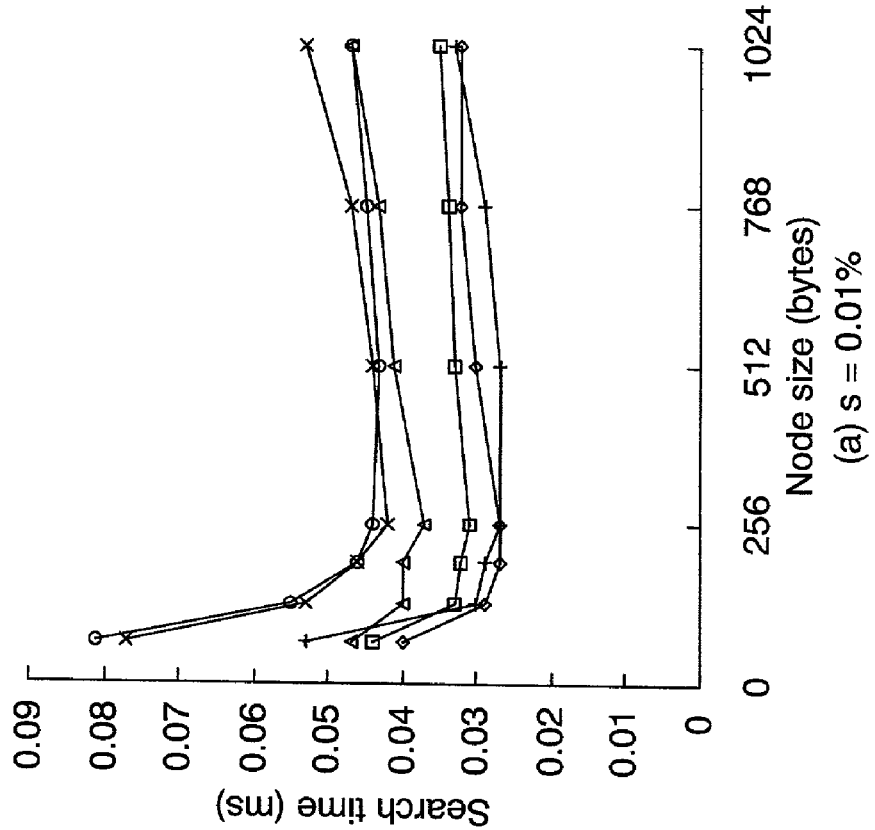

FIGS. 9A and 9B show the measured elapsed time spent searching various indexes bulk-loaded with the uniform data set such that each node is 70% full. As the node size grows, the search time quickly approaches a minimum. After passing the minimum, the search time increases slowly. The minimum moves to the right as the query selectivity increases. This trend holds for all the six trees, agreeing with the analytical results.

The CR-tree, the PE CR-tree, and the SE CR-tree form the fastest group. The R-tree and the PE R-tree form the slowest group. The FF CR-tree lies between the two groups.

Although the SE CR-tree is wider than both the CR-tree and the PE CR-tree, it performs worse. This is because the SE CR-tree calculates the reference MBR of a node from the matching entry in its parent node. In the present implementation, this calculation involves about 40 instructions and 16 bytes of memory write.

Figures 10A, 10B:
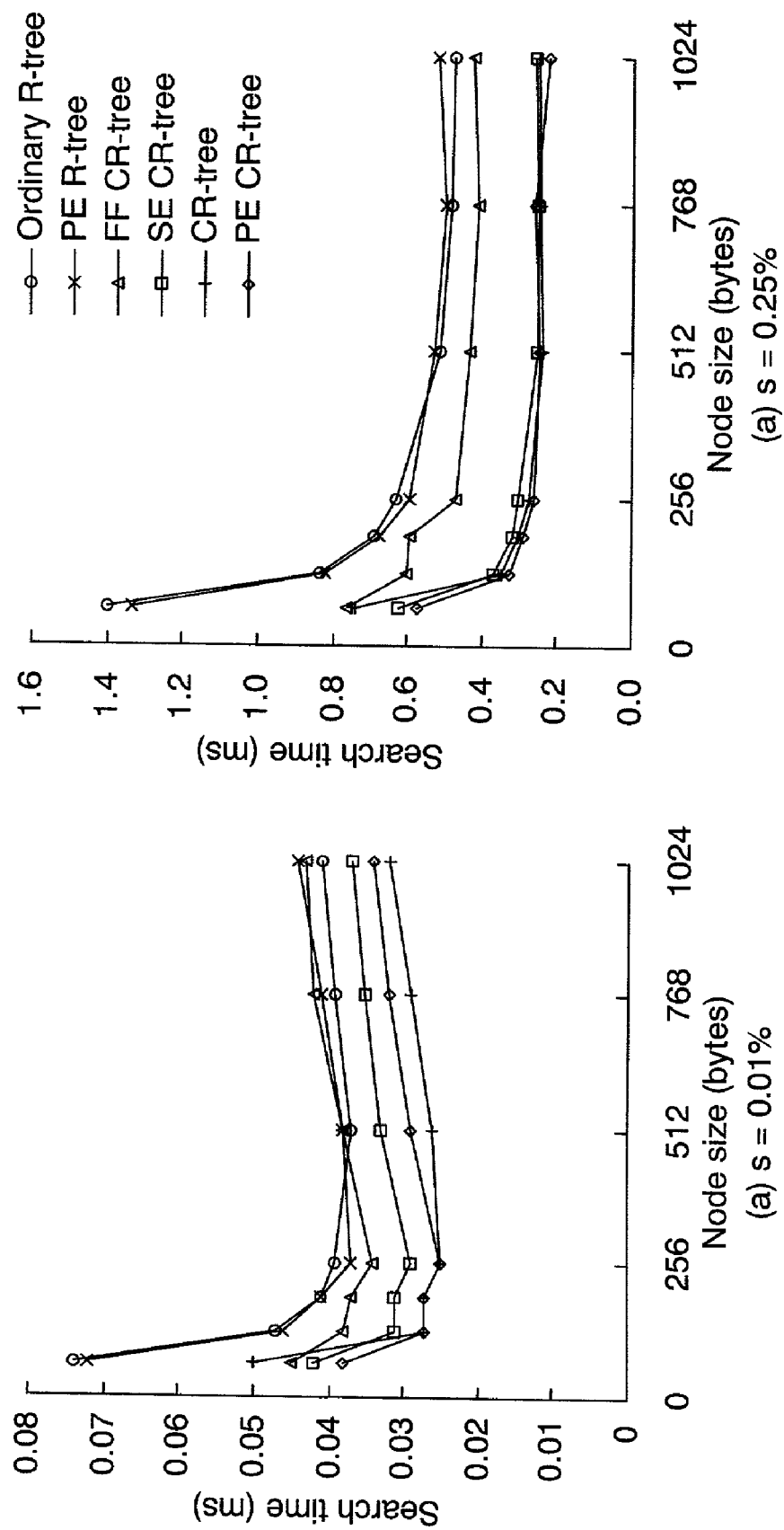
FIGS. 10A and 10B are graphs showing the search performance of bulk-loaded 2D trees with a skewed data set.

FIGS. 10A and 10B show the measured elapsed time spent searching indexes bulk-loaded with the skewed data set. There is not much noticeable difference from FIGS. 10A and 10B, indicating that all the six trees are more or less robust with respect to the skew for any node size.

Figures 11A, 11B:
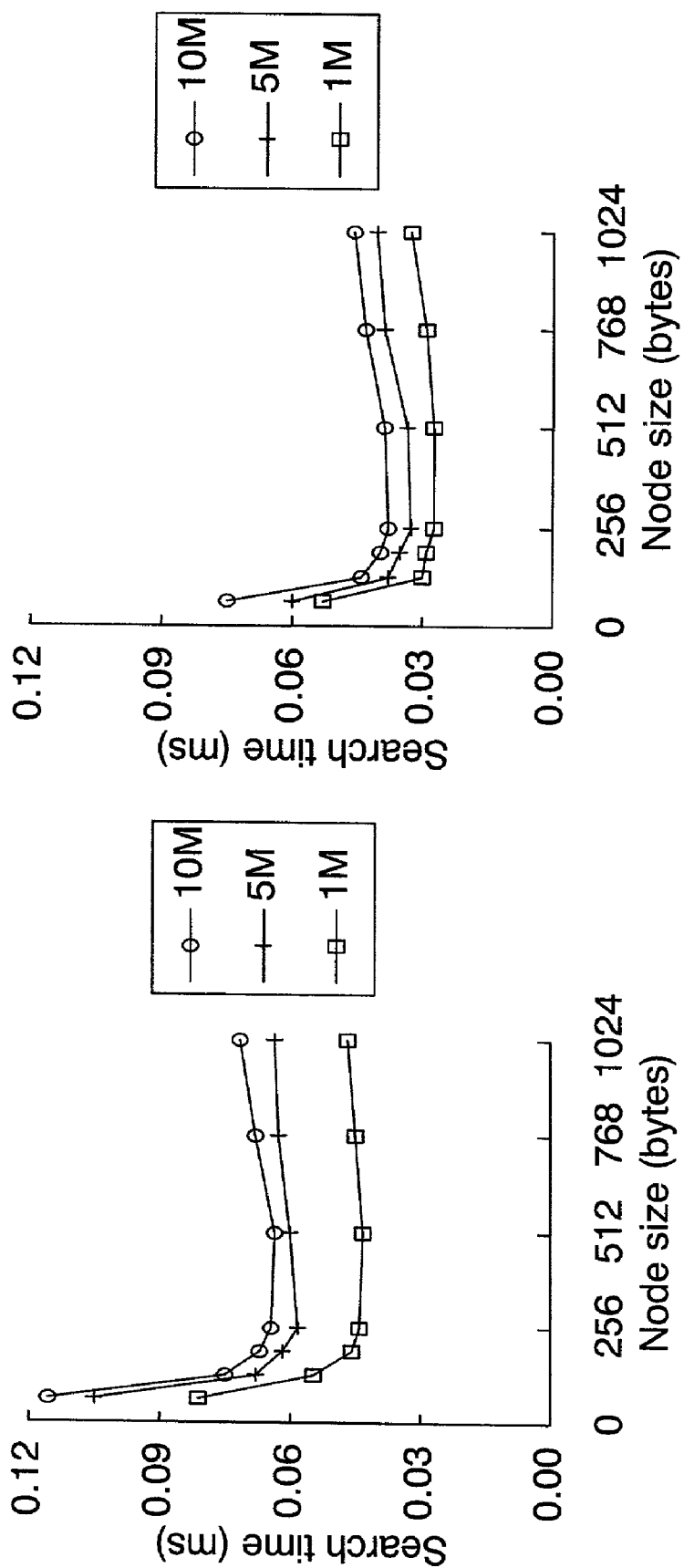
FIGS. 11A and 11B are graphs showing the search time of 2D R-trees and CR-trees with varying cardinality.

FIGS. 11A and 11B show that the CR-tree scales well with the cardinality. In this experiment, the size of query rectangles was set to be the inverse of the cardinality such that the number of found data objects is almost same.

Update Performance

To measure the update performance, 100,000 data objects were inserted into trees bulk-loaded with the 1M uniform data set, then removed 100,000 randomly selected data objects from the trees.

Figure 12B:
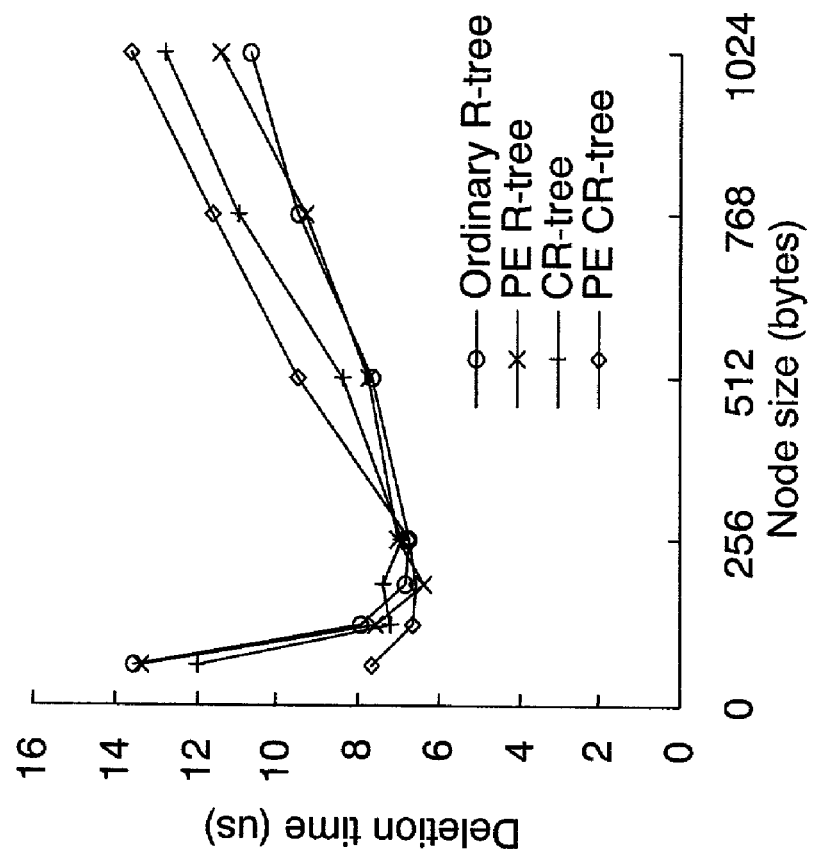
FIGS. 12A and 12B graphs showing the update performance on bulk-loaded trees with a uniform data set.
Figure 12A:
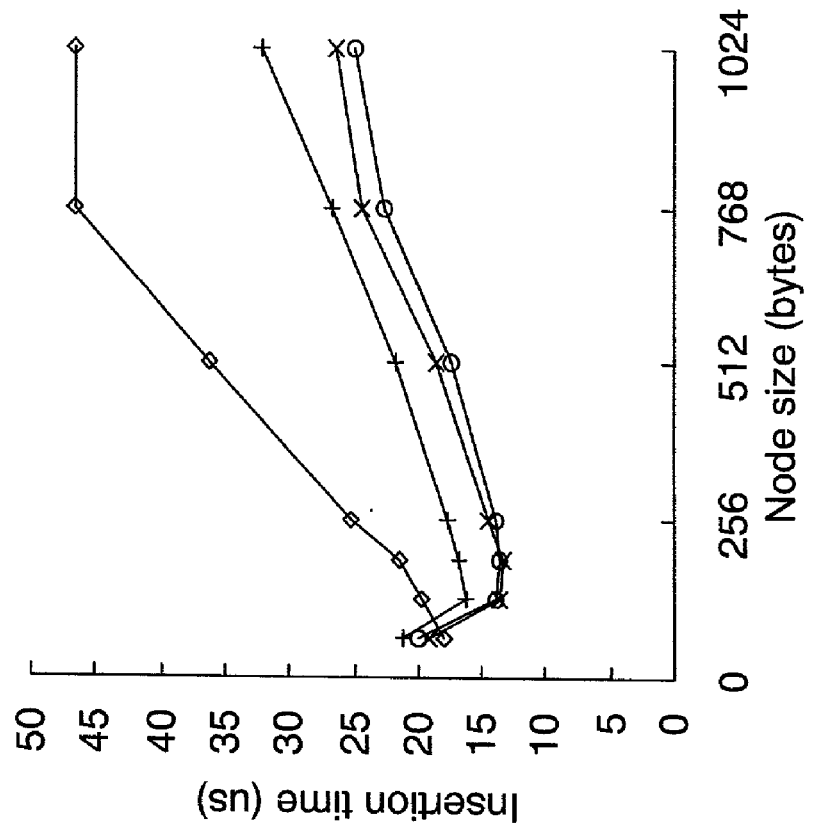

FIGS. 12A and 12B show the measured elapsed time per insertion and deletion, respectively. For a given node size, the CR-tree consumes about 15% more time than the R-tree when inserting. However, when the fanouts are the same (for example, the CR-tree with the node size of 256 bytes and the R-tree with the node size of 640 bytes), the CR-tree performs about the same or better than the R-tree. The reasons are as follows.

When descending a tree for insertion, the child node that needs to be enlarged least is selected. Since the enlargement calculation consumes about 30 instructions in the present implementation, it becomes more expensive than the cache miss in the CR-tree and its variants. Since a single cache block contains about 5.6 QRMBRs in the CR-tree, the enlargement calculation cost is about 168 instructions per cache block, but a cache miss consumes about 80~100 processor cycles on 400 MHz UltraSPARC II. On the other hand, since insertion accesses only one node for each height, the number of accessed nodes decreases logarithmically in the fanout, but the number of enlargement calculations for each node increases linearly with the fanout. Thus, the total number of enlargement calculations increases with the fanout.

The PE R-tree performs slightly worse than the R-tree because it increases the fanout by less than 25%. Since the fanout of the CR-tree is about 150% larger than that of the R-tree, it performs worse than the R-tree for a given node size. Since the fanout of the PE CR-tree is about 400% larger than that of the R-tree, it performs significantly worse than the R-tree for a given node size. On the other hand, when the fanout is same, the ranking of the CR-tree is determined by the saving in cache misses and the overhead of updating QRMBRs when the node MBR grows or shrinks.

FIG. 12B shows that the rankings for deletion are slightly different from those for insertion. Deletion is a combination of highly selective search and node update. As was expected from FIGS. 9A and 9B, the CR-tree performs similarly to the R-tree as the query selectivity decreases. On the other hand, node update becomes more expensive as the node size increases because the cost of updating QRMBRs increases. Therefore, the CR-tree outperforms the R-tree when the node size is small, but they cross over as the node size increases.

Figure 13B:
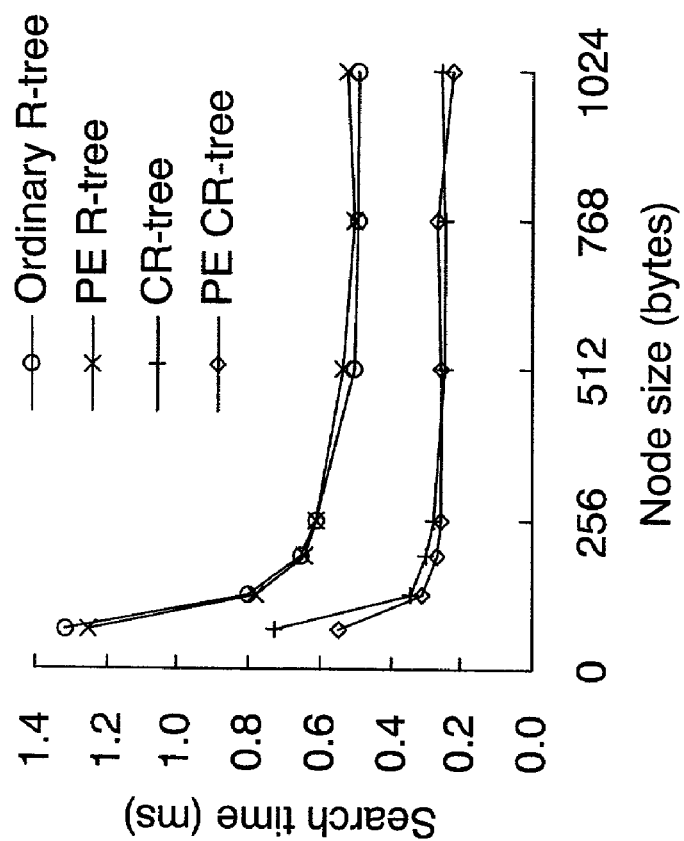
FIGS. 13A and 13B are graphs showing the search performance after insertion or deletion.
Figure 13A:
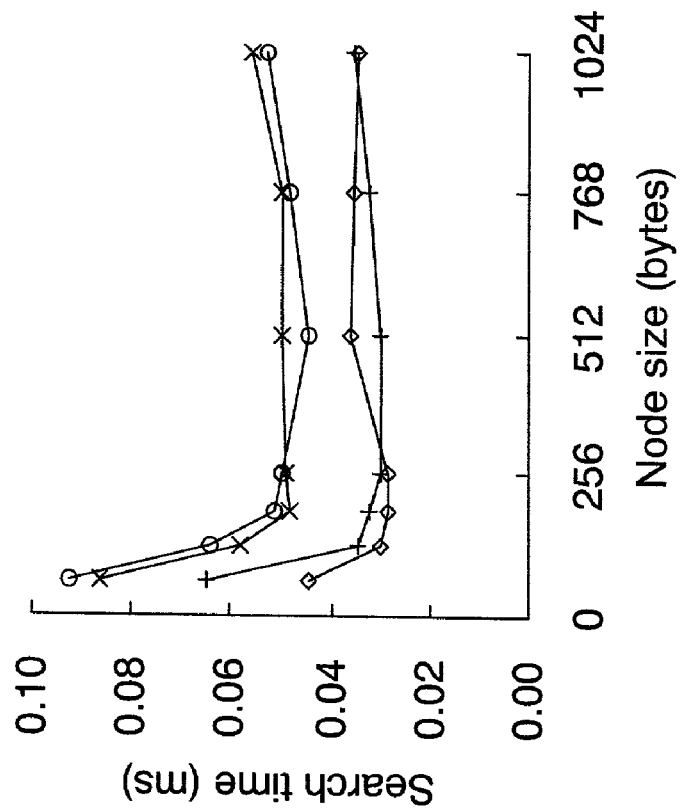

FIGS. 13A and 13B show the measured search time after the insertion and deletion. This experiment was conducted to check whether insertion and deletion affects the quality of the trees. As shown in FIGS. 9A and 9B, these trees are robust with respect to dynamic insertion and deletion.

Impact of Quantization Levels

To assess the effect of a quantization level, the ratio of false hits incurred by quantization, the quantization error in terms of the MBR size, and the search time for three different quantization levels, $2^4$, $2^8$, and $2^{16}$ were measured. These correspond to QRMBRs of 2 bytes, 4 bytes, and 8 bytes, respectively. The experiment used the trees bulk-loaded with the 1M uniform data set.

Figure 14C:
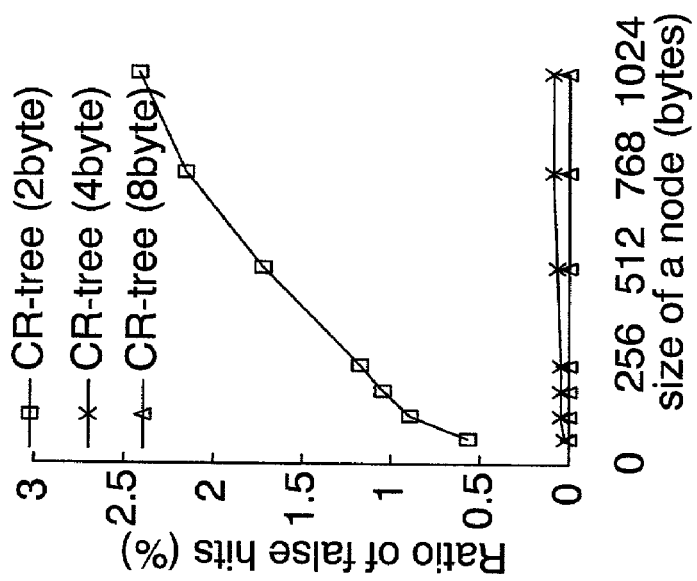
FIGS. 14A, 14B and 14C are graphs showing the ratio of false hits incurred by quantization.
Figure 14B:
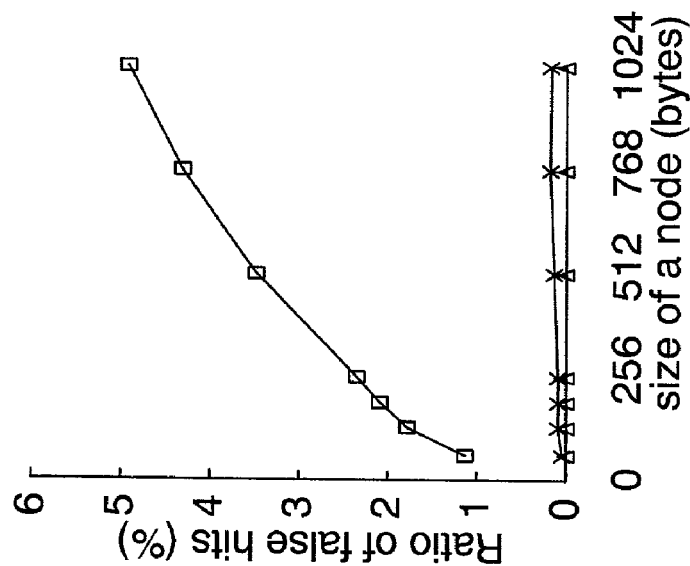
Figure 14A:
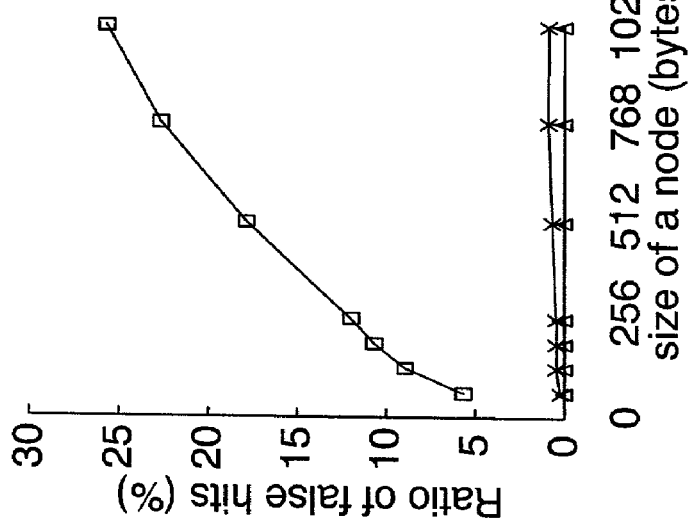

FIGS. 14A, 14B and 14C show the ratios of false hits measured for different quantization levels. It was shown above that the false hit ratio can be estimated by $(1+2\sqrt{f/l^2 N}(\sqrt{s}+\sqrt{a}))^2-1$. The false hit ratio increases wi fanout or the size of a node, and decreases with the quantization level and query selectivity. The measured results agree with the analytical results. When quantized into 16 bits, the search result is almost equal to the exact answer for a query. When quantized into 8 bits, the search result contains at most 1% more data objects compared with the exact answer. Quantizing into 4 bits can be used only when the query selectivity is high.

Figure 15B:
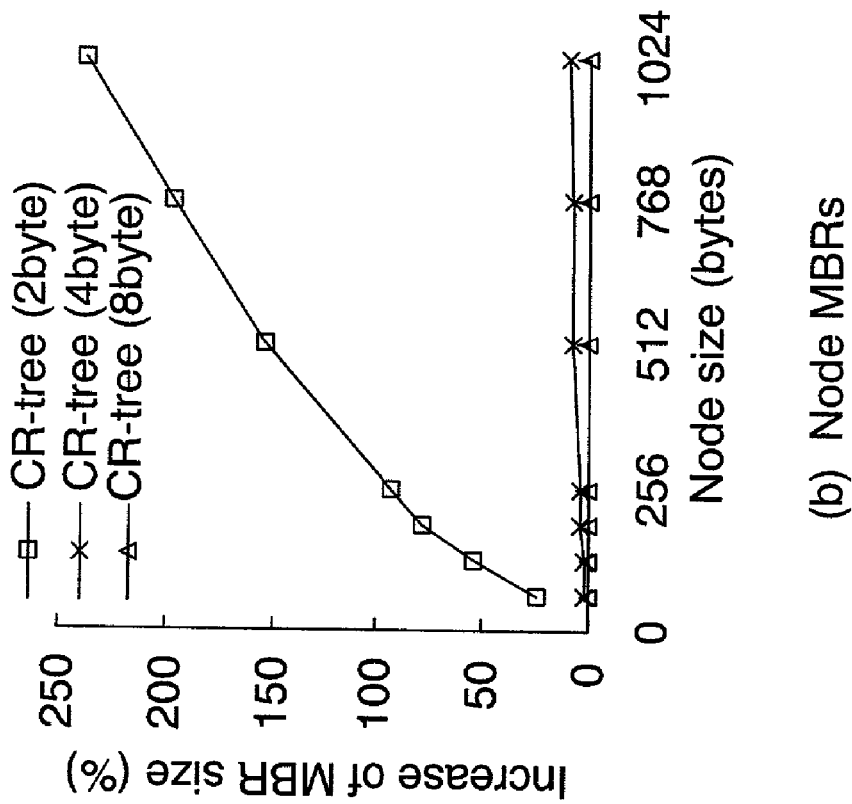
FIGS. 15A and 15B are graphs showing the increase of MBR size with varying quantization levels.
Figure 15A:
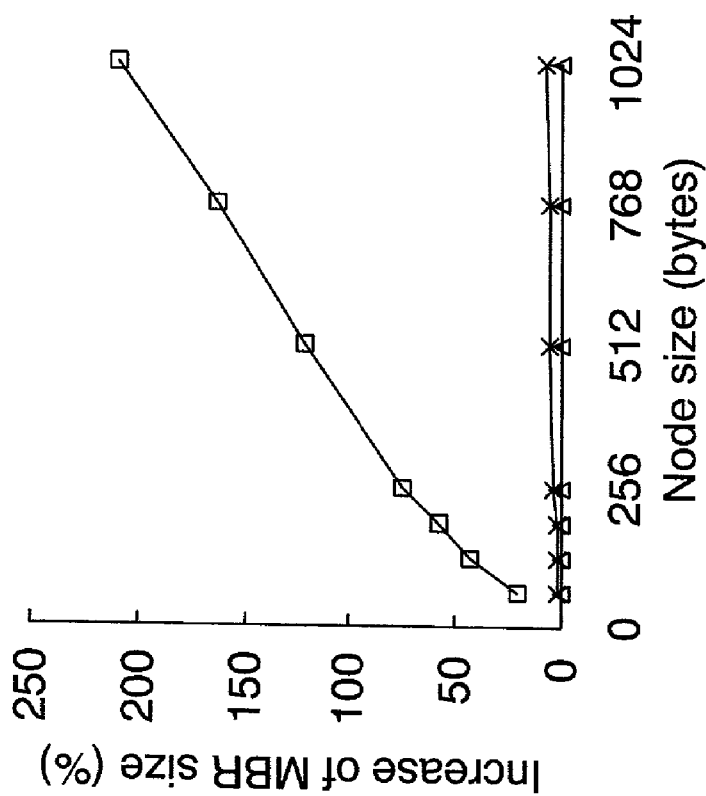

FIGS. 15A and 15B show the increase in the size of MBRs measured for different quantization levels. The above analysis showed that the size of a quantization cell is roughly $f/(l^2 N)$ for leaf nodes and a QRMBR extends its original MBR by the cell length along each axis. Thus, the size of QRMBR increases with the fanout or the node size, and decreases with the quantization level. The measured results agree with the analytical results. When quantized into 16 bits, the size of MBR increases by less than 0.01%. When quantized into 8 bits, the size of MBR can increase by 1~7% depending on the node size, but this does not lead to the same increase in the size of search result as shown in FIGS. 15A, 15B and 15C.

Figures 16A, 16B, 16C:
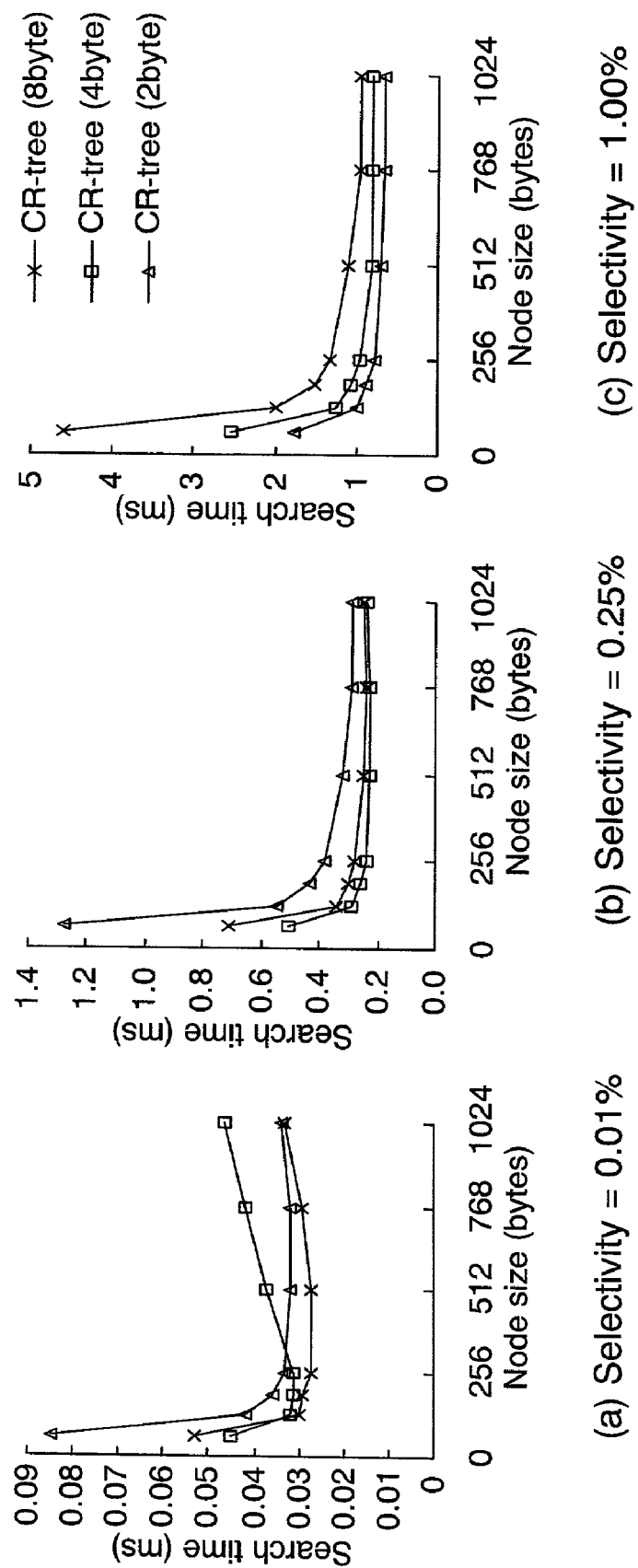
FIGS. 16A, 16B and 16C are graphs showing the search time with varying quantization levels.

FIGS. 16A, 16B and 16C show the search time measured with varying quantization levels. These figures show that a coarse quantization can result in the increase of the search time when the query selectivity is low and the size of a node is large. This is because of a significant number of false hits. In sum, it is possible to quantize into fewer bits as the query selectivity and the cardinality grows, but it is necessary to quantize into more bits as the size of node grows.

Figures 17A, 17B:
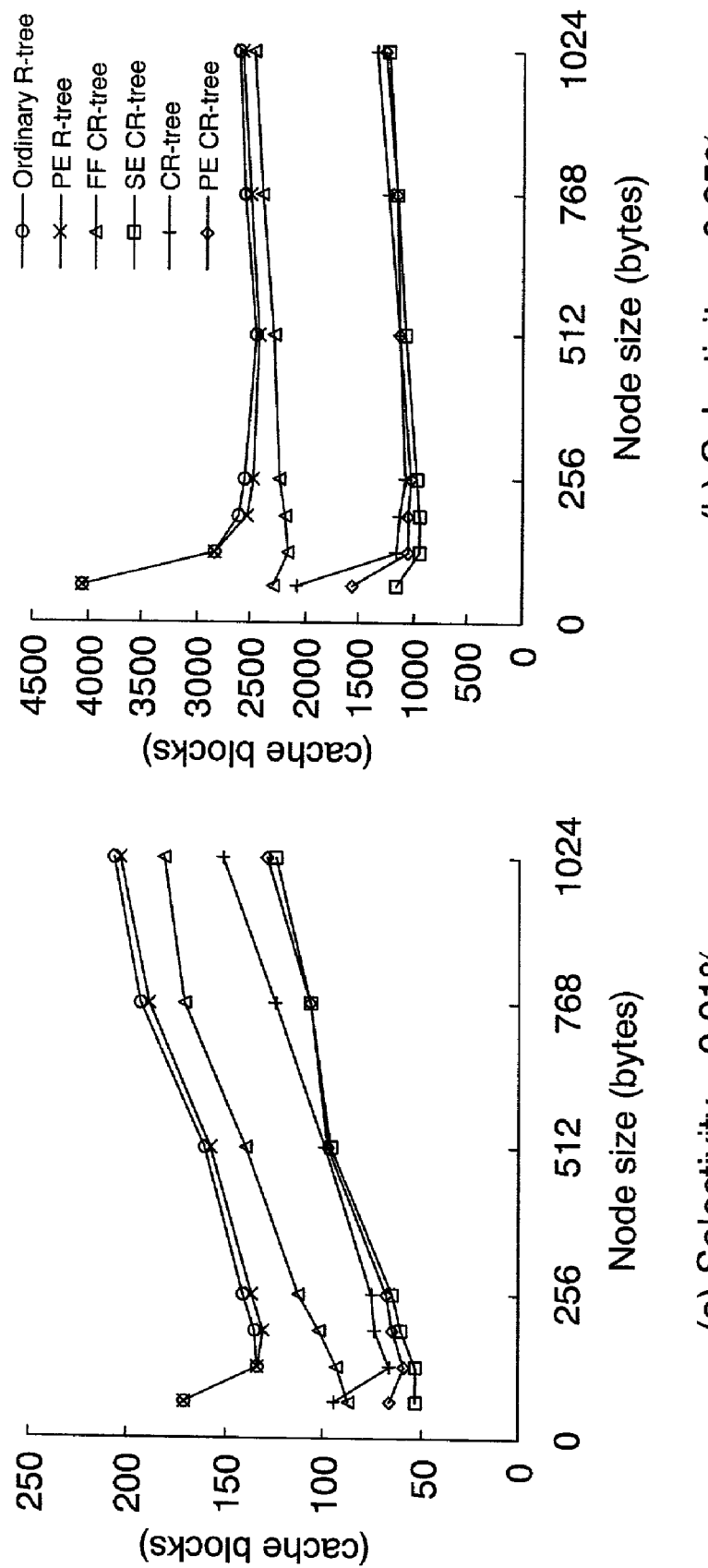
FIGS. 17A and 17B are graphs showing the amount of accessed index data.

FIGS. 17A and 17B show the amount of accessed index data, which is the L2 cache misses when no index data is cached initially or in the worst case of cache misses. In terms of the worst-case cache misses, the six trees are ranked from the best to the worst in the order of the SE CR-tree, the PE CR-tree, the CR-tree, the FF CR-tree, the PE R-tree, and the R-tree, from the best to the worst. The first three form one group, and the last two form another group as shown in FIGS. 9A and 9B. This measured result also agrees with the analytical results of FIGS. 6A and 6B.

Figures 18A, 18B:
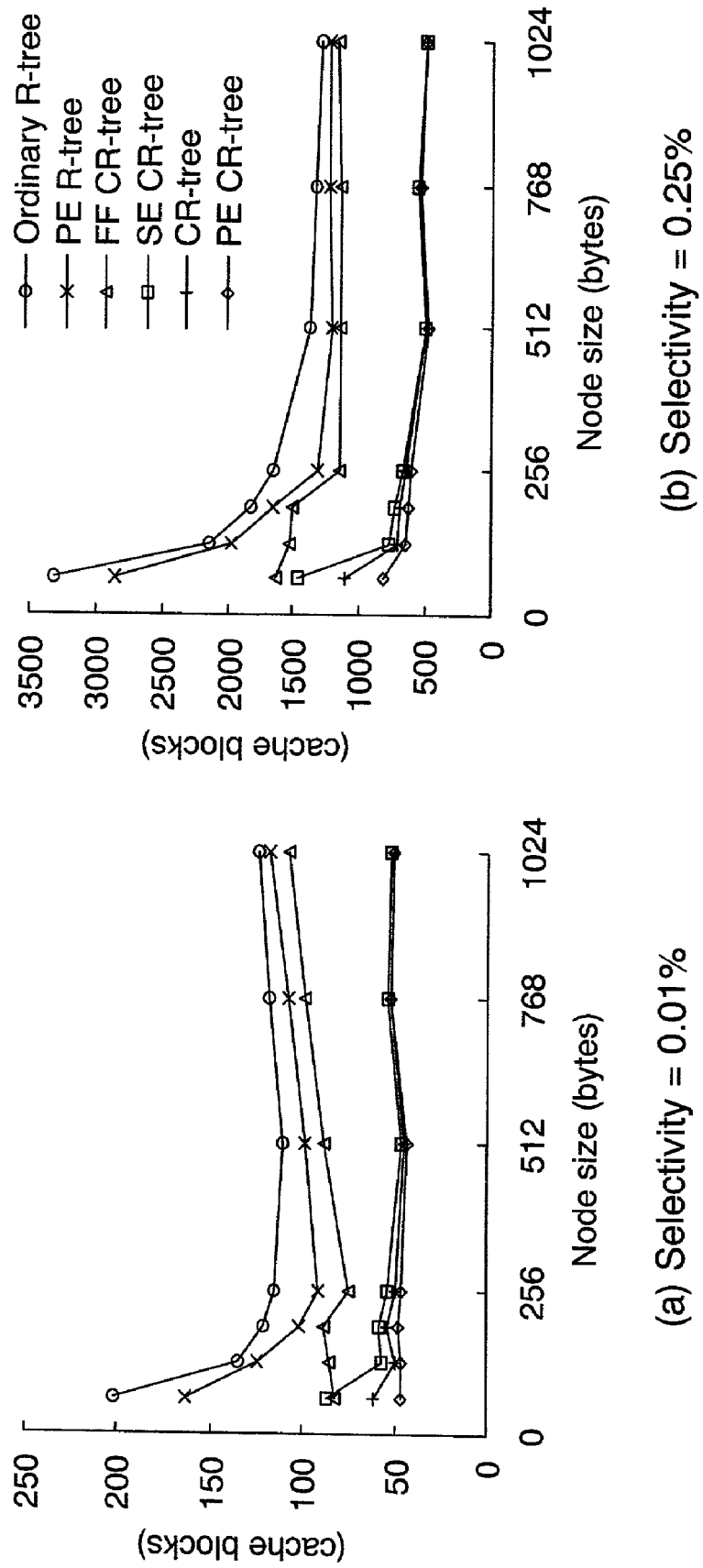
FIGS. 18A and 18B are graphs showing the number of L2 cache misses.

FIGS. 18A and 18B show the measured number of L2 cache misses using the Perfmon tool. The UltraSPARC processors provide two register counters for measuring processor events. The Perfmon tool was used to make these registers count L2 cache misses and to read the values stored in them. The number of L2 cache misses is slightly different from the amount of accessed index data because of cache hits and missing instructions. L2 cache misses by missing instructions explains why the number of measured cache misses can be larger than the worst-case cache misses in FIGS. 17A and 17B when both the node size and the query selectivity are small.

It is also observed that the cache hit ratio increases with the node size. This can be explained by the cache replacement policy of processors. Since memory blocks are mapped to cache blocks circularly (for example, by the physical address modulo the cache size), a cached memory block is not replaced by consecutive memory blocks. As the node size increases, the portion of accesses to consecutive memory blocks increases, and thus, the cache hit ratio increases subsequently.

Figures 19A, 19B:
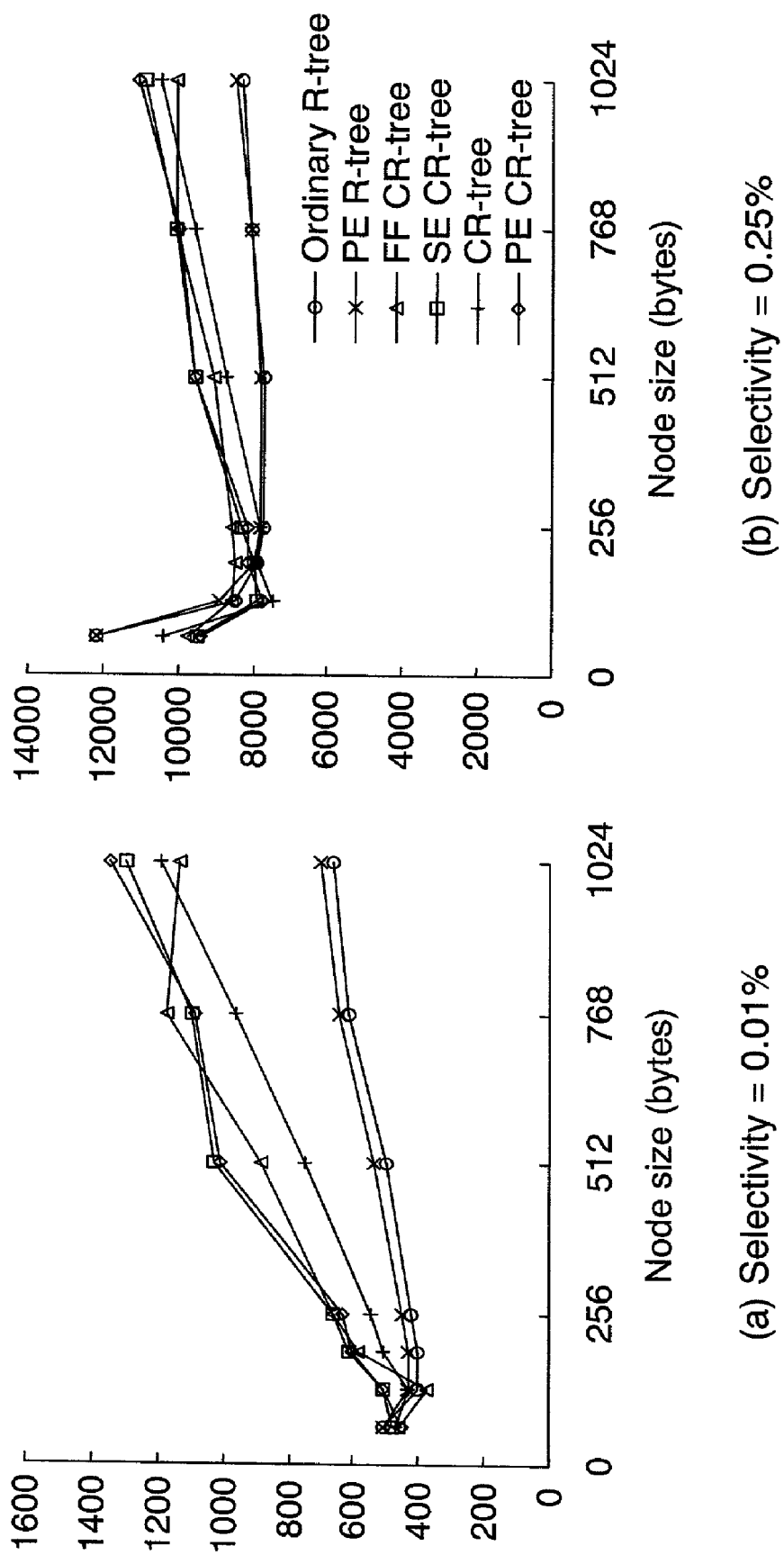
FIGS. 19A and 19B are graphs showing the number of key comparisons.

FIGS. 19A and 19B show the measured number of key comparisons with varying selectivity. As opposed to the number of cache misses, the QRMBR technique does not reduce the number of key comparisons, but rather increases slightly. Since the overlap test between two MBRs consumes less than 10 instructions on average in the present implementation, saving an L2 cache miss is worth saving at least 10 overlap tests. The R-tree and the PE R-tree have similar fanouts and form one group. The PE CR-tree and the SE CR-tree also have similar fanouts and form another group.

Concurrency Control

In order to keep the performance improvement by the CR-tree significant, a matching optimization of index concurrency control schemes is needed.

Since the conventional hash-based lock and unlock operation is too expensive for main memory databases, a faster latch and unlatch operation has been proposed. By allocating latch data structures statically and making them directly addressable without a hash, the latch and unlatch operation uses about 20 CISC (IBM 370) instructions, which may correspond to about a hundred RISC instructions. However, the latch and unlatch operation is still very expensive for concurrency control of main memory index trees because the present experiment with the CSB+-tree and the well-known lock coupling technique shows that each node is locked for only about 40 processor cycles.

To prevent locking operations from incurring additional cache misses, the data structures for locking needs to be kept within matching index nodes. To make it possible, the data structure for locking should be as small as possible. For example, the present proposal uses only one byte from each node.

Even if a lock conflict occurs, it will be resolved typically within tens of or hundreds of clock cycles. Therefore, spinning for the lock is preferred to blocking, which incurs a context switch consuming up to thousands of instructions.

In addition to making a locking operation cheap, it is desirable to reduce the number of locking operations. This is possible by giving a favor to searching in lookup-intensive applications such as in directory servers. For example, it is possible to make a search operation lock the entire tree if no update is in progress or make a search operation lock nothing by using a versioning technique.

Recovery

Since the present invention reduces the index size by almost 60%, the present invention also speeds up the checkpointing and post-crash restart processes by reducing the disk access time.

In main memory database systems, the durability of transactions is achieved through logging and occasional checkpointing. Checkpointing in main memory databases is the process of saving a snapshot of the memory-resident database onto a disk. The post-crash restart process consists of loading the latest snapshot and replaying log records generated after the latest checkpointing. Therefore, it is clear that the disk access time during checkpointing and restart decreases as indexes shrink in size. For example, the disk access time for the CSB+-tree decreases by 10% compared with the B+-tree, and the disk access time for the CR-tree decreases to less than half compared with the R-tree.

Figure 20B:
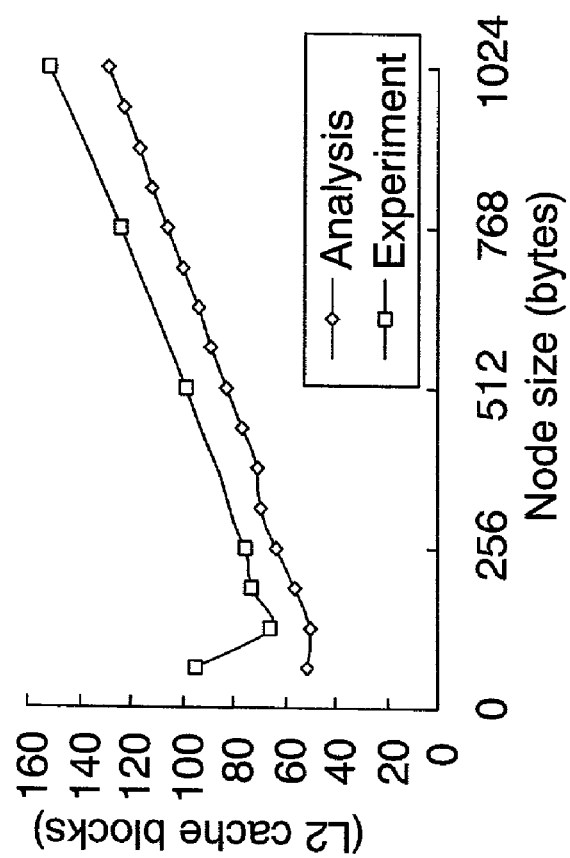
FIGS. 20A and 20B are graphs showing the comparison of analytical and experimental results for 2D CR-trees.
Figure 20A:
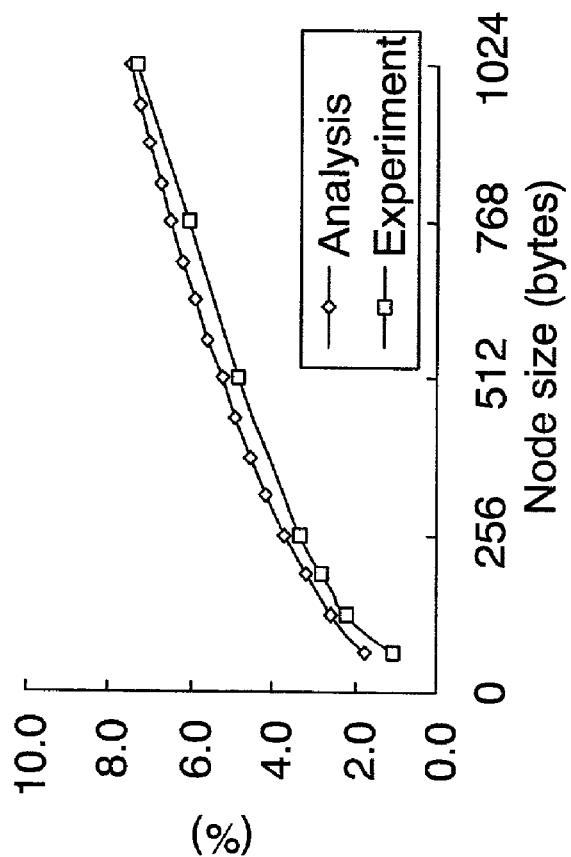

FIGS. 20A and 20B show that the analytical results agrees with the experimental results.

While the invention has been described with reference to preferred embodiments, it is not intended to be limited to those embodiments. It will be appreciated by those of ordinary skill in the art that many modifications can be made to the structure and form of the described embodiments without departing from the spirit and scope of the invention.

What is claimed is:

1. A method of accessing a multi-dimensional index structure resident in main memory for facilitating reference to data objects stored in a database, wherein the index structure consists of internal nodes having pointers to child nodes and leaf nodes having to database objects, the method comprising:

associating with each node a minimum bounding rectangle ("MBR"), wherein each MBR is a minimal hyper-rectangle enclosing a corresponding data object in the case of a leaf node and all hyper-rectangles in the child node in the case of an internal node;

representing each of one or more said MBRs by a relative representation of an MBR ("RMBR"), wherein the relative representation of an MBR ("RMBR") is coordinates of the MBR represented relative to coordinates of a reference MBR;

compressing each RMBR into a quantized RMBR ("QRMBR") by quantizing each RMBR using a given finite level of quantization, wherein the compressing includes cutting off trailing insignificant bits of the RMBR after quantization; and accessing the data objects stored in the database as a function of the QRMBR.

2. The method of claim 1, wherein said multi-dimensional index structure is an R-tree.

3. The method of claim 1, wherein said multi-dimensional index structure is an R*-tree.

4. The method of claim 1, wherein said multi-dimensional index structure is an R+-tree.

5. The method of claim 1, wherein said multi-dimensional index structure is a Hilbert R-tree.

6. The method of claim 1, wherein each internal node has a plurality of entries and wherein a first entry has a QRMBR and a pointer while the rest of the entries have only QRMBRs.

7. The method of claim 1, wherein each node stores a reference MBR.

8. The method of claim 7, wherein the reference MBR of a node is obtained from a corresponding QRMBR stored in the node's parent node.

9. The method of claim 1, wherein the internal nodes store QRMBRs while the leaf nodes store MBRs.

10. The method of claim 1, wherein said database resides in main memory.

11. The method of claim 1, wherein said database resides in disk.

12. A method of accessing a multi-dimensional index structure resident in main memory for facilitating reference to data objects stored in a database, wherein the index structure consists of internal nodes having pointers to child nodes and leaf nodes having to database objects, the method comprising:

associating with each node a minimum bounding shape, a multi-dimensional shape enclosing a corresponding data object in the case of a leaf node and all minimum bounding shapes in the child node in the case of an internal node;

representing each of one or more said minimum bounding shapes by a relative representation, wherein the relative representation is coordinates of the minimum bounding shape represented relative to coordinates of a reference minimum bounding shape;

compressing each relative representation into a quantized representation by quantizing each relative representation using a given finite level of quantization, wherein the compressing includes cutting off trailing insignificant bits of the relative representation after quantization; and accessing the data objects stored in the database as a function of the quantized representation to access.

13. The method of claim 12, wherein each internal node has a plurality of entries and wherein a first entry has a quantized representation and a pointer while the rest of the entries have only quantized representations.

14. The method of claim 12, wherein the reference minimum bounding shape of a node is obtained from a corresponding quantized representation stored in the node's parent node.

15. The method of claim 12, wherein said database resides in main memory.

16. The method of claim 12, wherein said database resides in disk.

* * * * *

UNITED STATES PATENT AND TRADEMARK OFFICE
CERTIFICATE OF CORRECTION

PATENT NO. : 7,283,987 B2  
APPLICATION NO. : 10/087360  
DATED : October 16, 2007  
INVENTOR(S) : Cha et al.

It is certified that error appears in the above-identified patent and that said Letters Patent is hereby corrected as shown below:

On Sheet 7 of 26, in FIG. 3E (Reference Numeral 377), line 2, delete "patent" and insert -- parent --, therefor.

On Sheet 9 of 26, in FIG. 3G (Reference Numeral 402), line 1, delete "patent" and insert -- parent --, therefor.

In column 3, line 18, after "12B" insert -- are --.

In column 4, line 50, before "the cost" delete "$be$" and insert -- be --, therefor.

In column 6, line 30, delete "$RMBR_p(C)$" and insert -- $RMBR_P(C)$ --, therefor.

In column 6, line 47, delete " $\log_2 \sqrt{f/N}$ " and insert -- $\log_2 \sqrt{N/f}$ --, therefor.

In column 8, line 32, after "301)" insert -- . --.

In column 8, line 44, after "step 2" insert -- . --.

In column 9, line 9, delete "ChoosLeaf" and insert -- ChooseLeaf --, therefor.

In column 10, line 13, delete "patent's" and insert -- parent's --, therefor.

In column 10, line 14, delete "(4011)." and insert -- (401). --, therefor.

In column 10, line 14, delete "patent" and insert -- parent --, therefor.

In column 12, line 18, delete " $(\sqrt[d]{s}+\sqrt[d]{a_h})_i^d$ where" and insert -- $(\sqrt[d]{s}+\sqrt[d]{a_h})_i^d$ where --, therefor.

In column 12, line 46, before "where" insert -- , --.

In column 13, line 29, delete "64" and insert -- 4A --, therefor.

In column 14, line 18, delete "Exprmental" and insert -- Experimental --, therefor.

UNITED STATES PATENT AND TRADEMARK OFFICE
CERTIFICATE OF CORRECTION

PATENT NO. : 7,283,987 B2
APPLICATION NO. : 10/087360
DATED : October 16, 2007
INVENTOR(S) : Cha et al.

It is certified that error appears in the above-identified patent and that said Letters Patent is hereby corrected as shown below:

In column 16, line 6, delete "wi" and insert -- with the --, therefor.

Signed and Sealed this

Tenth Day of February, 2009

JOHN DOLL
*Acting Director of the United States Patent and Trademark Office*